United States Patent

Mendelson et al.

[15] 3,701,977

[45] Oct. 31, 1972

[54] GENERAL PURPOSE DIGITAL COMPUTER

[72] Inventors: Myron J. Mendelson, Encino; Alfred W. England, Los Angeles, both of Calif.

[73] Assignee: Delaware SDS, Inc., El Segundo, Calif.

[22] Filed: Oct. 27, 1969

[21] Appl. No.: 869,773

Related U.S. Application Data

[63] Continuation-in-part of Ser. No. 572,835, Aug. 16, 1966, abandoned.

[52] U.S. Cl. ............................................... 340/172.5

[51] Int. Cl. ............................................... G06f 9/18

[58] Field of Search ..................................... 340/172.5

[56] References Cited

UNITED STATES PATENTS

| | | | |
|---|---|---|---|
| 3,412,382 | 11/1968 | Couleur et al. | ..........340/172.5 |
| 3,546,677 | 12/1970 | Barton et al. | ..........340/172.5 |
| 3,317,898 | 5/1967 | Hellerman | ..........340/172.5 |
| 3,359,544 | 12/1967 | Macon et al. | ..........340/172.5 |
| 3,525,080 | 8/1970 | Couleur et al. | ..........340/172.5 |
| 3,528,062 | 9/1970 | Lehman et al. | ..........340/172.5 |

*Primary Examiner*—Paul J. Henon
*Assistant Examiner*—Ronald F. Chapuran
*Attorney*—Smyth, Roston & Pavitt

[57] ABSTRACT

A computer CPU and memory system with private, fast access CPU memory organized in blocks and program variable block selector. The locations of the selected block serve as accumulator extension and index registers. Mapping, memory protect and interrupt features with priority control are included.

8 Claims, 5 Drawing Figures

PATENTED OCT 31 1972 3,701,977

SHEET 1 OF 3

INVENTORS:
Myron J. Mendelson
Alfred W. England
By [signature]
ATTORNEYS

INVENTORS:
Myron J. Mendelson
Alfred W. England
By Smyth, Roston & Pavitt
ATTORNEYS INVENTORS:
Myron J. Mendelson
Alfred W. England
By Smyth, Roston & Pavitt
ATTORNEYS

GENERAL PURPOSE DIGITAL COMPUTER

This is a divisional application of application, Ser. No. 572,835, filed Aug. 16, 1966, now abandoned in favor of a continuation application, now U.S. Pat. No. 3,594,732.

The present invention relates to improvements in general purpose, stored program, digital computers, and more particularly it relates to the mode of organizing the memory for such a computer for multiprogramming, permitting a rapid change from one program to another in response to interrupt signals or otherwise.

BACKGROUND

Modern general purpose digital computers usually have a memory characterized as a random access memory, in that the individual storage locations for such a memory can be accessed at any time with no preference as to particular locations, nor is it required that the locations be accessed in a particular sequence, and the access time to any of the storage locations is at any instant the same for all locations. Computer memories of this type usually comprise magnetizable cores arranged in matrices whereby the state of magnetization of an individual core defines its content in terms of bits having binary bit values. A core is the smallest storage unit, small not so much understood in regard to physical dimensions but as to capacity of storing information.

Such a memory is usually accessed in that groups of storage locations are addressed concurrently and such groups for example individually define the storage location for a word whereby a word is comprised of a predetermined number of bits.

The memory locations as defined usually hold all of the information needed to execute a computer program. This information usually includes words having direct numerical or other symbolical significance, and are subject to processing as the principal purpose of the computer program. Other words include instructions whereby an instruction contains a code identifying the type of operation to be performed and, for example, a code number identifying a memory location to be related to the operation.

When such a memory or storage location is accessed, for example, by reading its content, it is necessary to institute a so-called read-write cycle. During the read phase the content of the addressed memory location is, for example, passed into a memory register. The nature of this reading process is a destructive one, i.e., it destroys the information in the memory location. Thus, normally, the same word has to be written back into the memory location from which it has been drawn and this accounts for the write phase of a memory cycle. Such a read-write cycle defines the period of time of the shortest order in which this type of memory can be accessed. Occasionally, it may be permissible to read without re-recording as the word will no longer be needed in the memory. However, from standpoint of programming it may not be desirable to distinguish between a word transfer from memory with or without re-cording. Thus the general case for memory accessing will be a full read-write cycle.

The magnetic properties and particularly the saturation changes of these individual cores storing the individual bits limit the speed of access to the memory. The reading and the writing processes, i.e., the time integral of the electric current necessary to change the state of magnetization of such a core requires a particular value, and the current is limited by the physical dimensions employed, so that the time needed is a fixed parameter. A read-write cycle with presently known equipment is in the range of 0.5 to 1 microsecond and shortening of this period of time though feasible has been proven impractical for many reasons.

A general purpose stored program computer usually operates in that for execution of a program individual memory locations are sequentially accessed. A location so accessed may hold an instruction to be executed next, or such a location is either the source or the destination of an operand. In many instances the content of an individually accessed location, for example, to the word level, is then passed into a central processor to be processed in accordance with a concurrently provided control or operating code. For unambiguous operation only one word location at a time (per memory cycle) is accessed to permit passage of one word, for example, between the memory and central processor and in one or the other direction. This means that in case two or more words are involved in a particular operation, one will usually need two or more memory cycles for the transfer of words.

For example, an operation requiring the adding of two numbers will normally require that first the augend is passed from the memory to the central processor, for example, into a so-called accumulator register. In a subsequent memory cycle the addend will be drawn from a different memory location and processed in the central processor, and the sum is left in the accumulator register. Another memory cycle is required to transfer the sum back into a memory location, in order to render the accumulator register available for another process. Usually each of these operations as just described will be characterized by different instructions, and three additional memory cycles are required for accessing those memory locations which hold the instructions to the effect of providing the above identified and described operating steps. Accordingly the sequence of the operation just referred to requires six memory cycles.

These six memory cycles run as follows. The program counter register will in a particular instant provide a memory location addressing number and a first memory cycle will be instituted to provide access to this particular memory location. After access the content thereof is withdrawn, and it may be presumed that an instruction is being received to the effect that it provides a control code and a memory location addressing number, whereby the control code may call for the transfer of a word from the concurrently identified memory location to the accumulator register. This transfer step will be then carried out in the second memory cycle.

After having completed this transfer operation the program counter will call on another memory location which now requires a third memory cycle. During this third cycle an instruction may be received, again having a control or operating code and a memory location identifying code, whereby the control code may require that the number held in the concurrently provided memory address location be added to the content of the accumulator. This addition will usually be carried out in the next memory cycle, the sum remaining in the accumulator register. Having completed the adding operation, the program counter will again call on the next memory address location as programmed, this now in the fifth read-write cycle, and this memory location may now hold an instruction to the effect that the word presently held in the accumulator be stored into the location designated by the concurrently provided memory address during the fifth memory cycle. This sequence will be required in full unless the augend is already in the accumulator having resulted from another arithmetical operation which directly preceded the one described, and/or unless the sum arrived at by the addition is needed only for another arithmetic operation immediately succeeding the one described. In all other cases, the accumulator must first be loaded, and its content must be stored subsequently, because the accumulator must be available for other operation, hence it cannot serve as storing unit.

This latter point is particularly crucial. The accumulator usually requires at least two registers, in case of floating point arithmetic is to be provided for. This means, that the processing unit can be made available for any kind of operation only after the contents of the accumulator registers have been stored away in memory.

A powerful computer must be provided with an interrupt system permitting the interruption of the current program so that the computer can turn to a more urgent task. This is particularly important if the computer operates in a real-time environment, or on-line. In these cases sensitive demands of events external to the computer are imposed upon the computer. If the computer is shared by different users being located remotely from each other and from the computer proper, each user may want use of the computer at any time. Here then different unrelated programs are to be held in the computer and are being executed in a multiplexing type fashion. To each of, for example 10 users, it will appear that he uses the computer alone except that the computer appears to him to be only one-tenth as fast as it actually is. This, however, requires that the computer can switch from one program to another rapidly. In other words, when there is a change from one program to another, not much computer operating time should be wasted on operations with which the computer organizes the sequencing of "useful" operations.

Aside from the accumulator register there are other registers in the computer holding numbers and other data pertinent to the program. For example, there are so-called indexing registers holding, i.e., temporarily storing, numbers for purposes of modifying addressing code numbers. All these numbers in these registers must conventionally be stored first in memory locations before the computer can shift to another program, for example, because of an interrupt or because of the above-mentioned program multiplexing.

SUMMARY OF INVENTION

The invention now provides improvements in the relation between the accumulator and other processing registers, and the memory. In accordance with the present invention it is suggested that the memory be extended to include a plurality of registers. Registers usually comprise bistable stages, one each for storing a single bit. The access speed for a register is limited only by the electronic components employed, particularly by the time to attain stable electric states. This access speed can be made higher by more than one order magnitude as compared with the access to the core memory. In the following, therefore, it shall be distinguished between a slow access memory portion and a fast access memory portion. The fast access memory portion will be comprised of registers having bistable electronic states, such as transistor flip-flops. The slow access memory may be a core memory or of a type of even slower access including non-random type memories such as disks, drums, delay lines, tapes, etc.

The principal function of the fast access memory is to serve in a dual role. In one aspect the fast memory will serve as memory in that the registers of the fast memory store data words for any length of time. These registers may then be included in the memory continuum and may be made addressable as memory locations, or a special mode of access to these fast access memory locations may be provided, or a combination thereof. In the alternative role the memory registers may serve as processor extensions. For this purpose the registers of the fast memory are organized in groups, and the groups are individually identifiable by special codes. These codes will also be designated as block pointing codes, and the groups of registers will be called blocks.

During operation a particular block pointing code is provided, for example, in a special register thereby identifying and preliminarily accessing a group of the fast memory registers. Any register of this group or block then serves as an accumulator. There still is provided a processor input register, but the analogy thereof to the conventional accumulator register is not a close one, as the processor input register is only a temporary operating element facilitating the handling of data but having no particular significance as a location identifiable in a program. This processor input register thus never holds data other than those immediately processed, and then only temporarily without requiring programmed loading and emptying steps of the nature described above. All other data are held in particular ones of the memory registers of the current block. In other words, it is the current block which is now the accumulator proper. Each memory register is addressable. This leads to a particular format of the instruction word.

The principal form of the instruction word now used will include, as is conventional, an operating or control code designating the operation to be performed. When a particular control code is present in the processing unit, particular control operations for which the unit is wired will be performed by the unit. The instruction word will further include a subcode which identifies a particular memory register in the current block as an operand source, a result destination or both, thereby defining the particular accumulator or processor input extension involved in the particular operation called for by the operating code.

The particular operate code may imply that the thus identified register is the first one of several to be used as accumulator. Another code may identify a register in the current block to be used as an index register. The subcodes taken together with the code number held in the block pointing register are the address codes for memory registers.

In addition the instruction word will include bits representing information of numerical significance. This may be a number to be used directly as arithmetic operand, or it may be a number that represents a memory address which holds the arithmetic operand, or is the destination of an arithmetic operand. Thus, considering the memory as an entity to include both, fast and slow access portions, most instruction words, particularly those used for arithmetic instructions, will therefore identify two or more memory locations, all related to the particular operation called for by the operating code.

The fast memory will include a further plurality of registers, individually addressable by a portion of an address code of the type used to address a slow access memory location. This portion is defined by the higher bit positions of this address code, and it thus can be regarded as a page address for a fixed plurality of memory locations. A page address accesses a page in the memory. Now, in the alternative, such a page address is used to address one of the registers in the further plurality, holding an alternative page address to be concatenated with the unchanged low order bits of the original memory addressing number. Data contemplated by way of programming to be located in particular memory locations, can be relocated in case several computing programs are to be stored in the memory, as the original address locations assigned to a program may not be available because occupied by a different program.

It can thus be seen that the fast access memory taken as a whole permits a dynamic change of addresses. Take an instruction presented in a word format as defined above and to be executed; now the full length memory addressing code therein may be subjected to these modifications: One of the subcodes of the instruction word together with the current block pointer code, addresses or accesses a first fast memory location, the content of which is added to the full length memory addressing number to arrive at a different program address location. This process is called indexing. A portion (high order bits) of this new addressing number, or a portion of the original addressing number when there was no indexing, is used to address a second fast memory location, usually outside of the current block, to exchange the page address of the present address location for a new one. This process is called mapping. The final addressing number thus arrived at is then used for memory accessing.

The principal advantage of the instruction word format and of the resulting implementation is derived from the fact that the instruction word may not only identify two registers for address modifications, but also two memory locations of two major operands, which location can be accessed independently, i.e., concurrently to be concurrently processed. It should be emphasized, that this has nothing to do with two-address instruction computers in which an instruction word includes an operand address as well as the address for the next instruction. Also, multiple address systems are known wherein the instruction word includes several operand addresses, all defining locations in a slow access memory to be accessed sequentially. The present invention is explained as an improvement for a single address computer in which the instruction word will include not more than one address to a slow access memory location, all other memory locations identified by the instruction word are of the fast access types. Utilization of the invention principles is possible to improve two address or multiple address computers accordingly.

One of the subcodes in an instruction word, as explained above, together with the block pointer code causes access to a fast access memory location which thereby becomes the current accumulator holding the first operand. The full length address, possible after having been modified as set forth in the previous paragraphs provides access to a second memory location which may be a fast or a slow memory location holding the second operand. In the embodiment described herein fast memory locations are not mapped but in other embodiments the mapping may be extended to these memory locations. Thus, after a single slow memory location access cycle or even faster, two operands are available for processing. The block pointer concept permits a rapid change from one register block to another in that by changing the block pointer code the entire previous block becomes memory and a new block becomes accumulator. This latter aspect, however, is not a restrictive one in that the registers of the new block can serve only as accumulator registers. Some of them may also be used as indexing registers, or they may hold any kind of numerical or control information pertinent to the execution of particular operations; they may hold addressing codes thereby impliedly converting an instruction to a two-address code type instruction without enlargement of the format of the instruction word. They may hold count numbers for purposes of defining a particular plurality of memory locations, the first of which is, for example, defined in the address field of an instruction word. Thus, the register blocks are collectively definable as memory, and individually they are definable as general purpose registers of programmable versatility.

This block concept in cooperation with the above defined mapping permits multiplexing of execution of several independent programs in a manner which permits devotion of the computer most extensively to the execution proper of the several programs without wasting undue time for organizing the changeover from one program to another. The mapping permits location of any number of independent programs in the computer memory, limited only by the capacity of the memory and not by the availability of the particular memory locations as written in the several programs. The residency of a program in the memory can be determined solely by its urgency and not by the availability of explicitly programmed locations for storage.

The shifting from block to block for a change from one program to another one thus permits the shifting from one program to another without having first to manipulate with numerous operands, data, etc. held in the block that was used just prior to the time when such a change became necessary. This aspect of a fast change from program to program is further important for a speedy response to time sensitive interrupts occuring at a time when any program is in progress.

The instruction word format includes the possibility of transferring one word from a core memory location to a memory register of the current block or vice versa, which can be interpreted again as a loading process, for example, of the accumulator index register, etc., but it can also be interpreted as an intermemory word transfer. If, however, the program is written so that one of the operands is always in a memory register of the current block, these mere transfer or relocation operations can be held to a minimum. Referring to the description of an adding operation given above or of a program change, it now becomes possible in many cases to dispense with the loading-the-accumulator and/or store-the-result-in memory operations provided the programmer makes optimum use of the fact that fast access locations are both, memory and accumulator.

The several bits in the instruction word can be interpreted in various ways involving similar process operations. For example, one or more portions will always refer to a memory register. The content of this memory register is then added to a second portion of the instruction word. If this second portion defines an addressing number, the process is what was above called indexing, to be used for calculating a different memory address. If, however, this second portion in the instruction word has immediate numerical significance, the process is a direct operand type adding operation. In the case of indexing, a portion of the newly calculated number (an addressing number) can be used for mapping, i.e., for accessing another fast access memory register; in case of adding as immediate type arithmetic operation, the resulting number is stored in the fast memory register from which the addend was drawn.

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings, in which:

Figure 1:
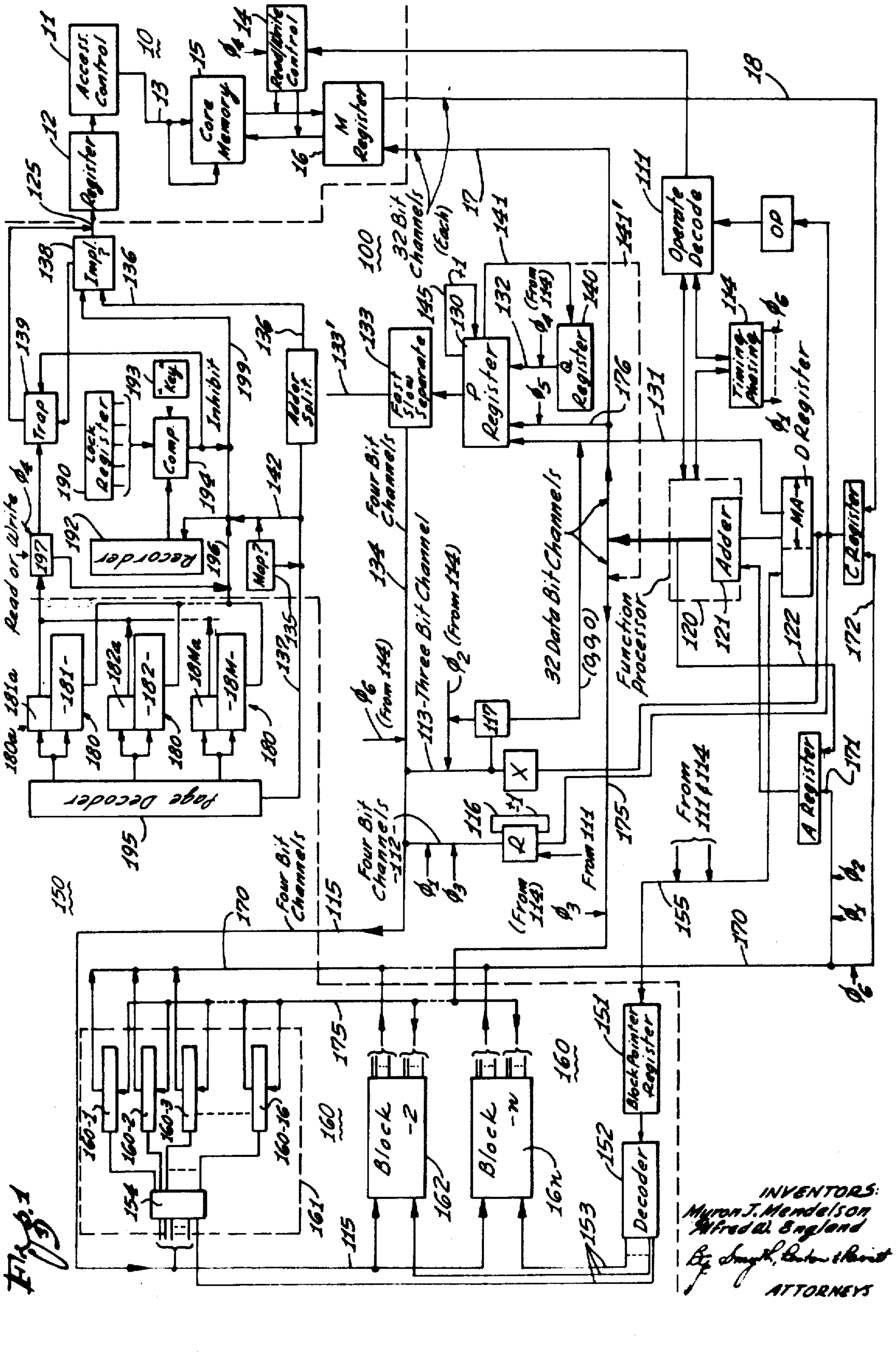
FIG. 1 illustrates somewhat schematically a block diagram of the principal elements used to improve a digital computer in accordance with the present invention.

Proceeding now to the detailed description of the drawing, in FIG. 1 thereof there is shown a portion of the central processing unit CPU–100 and a core memory unit 10. The entire memory for the computer presently described includes the core memory unit 150 which is part of the central processing unit, but the fast memory is available as memory in parts and at different degrees of accessibility. The unit 150 can also be called private memory of the CPU.

The core memory 10 is conventional per se and thus shall be described here only very briefly and as far as necessary. The core memory proper 15 comprises ring core matrices for storing data bits in a word format which includes 32 bits per word, and each bit is stored in a single ring core. The 32 ring cores storing the bits of a word will be referred to hereinafter as a memory location, or as a slow access memory location. An access control system 11 selects the particular memory location to be addressed. The access control system 11 has a plurality of input lines or channels which respond to bits defining an address code number as long as held in the addressing register 12. The input for register 12 is a memory bus 125 having as many channels as there are bits necessary to define a core memory address. The control device 11 decodes the number code held in register 12 and provides resulting control signals to output lines 13. The signals in lines 13 call on specific address locations in the core memory 15.

A read and write control network 14 cycles the memory through alternating core memory read-out and write-in phases, each phase being of sufficient duration for causing the necessary changes in magnetization in the individual memory cores of the memory location as currently addressed.

Usually a full read-write cycle lasts about 1 microsend; present day development permits the reduction of this period to 800 nanoseconds and below. The duration of each read-write cycle is determined by the speed with which the magnetization of a core in memory 15 can be changed from one saturation level to the opposite one. For reading of the content held in a memory location, a full read-write cycle is required, because core memory reading is a process which destroys the information defined by particular magnetization of the cores, so that the word read out must be written back into the same location.

During the read phase the word as read from the addressed location is loaded into the M register 16, and from there the same word is re-recorded into the same location in the succeeding write phase. Sequences of core memory reading steps thus require sequences of full read-write cycles, which is a limiting factor in computer speed. During recording or writing alone, the addressed memory location is first read thereby destroying the previous content thereof. The M register receiving the content of that memory location is then cleared completely in case a full new word is to be recorded. That new word is then set in the M register and subsequently recorded into the still accessed memory location. In cases of recording half-words or quarter-words (bytes), the original content of the particular location after having been read first into the M register is only partially destroyed and the new half-word or byte is then substituted for one of the two half-words or for one of the four bytes then held in the M register, subsequently the entire word written into the particular location.

The memory address codes are developed by and in the central processing unit 100, as will be described below. For describing the present system, it shall be assumed that memory bus 125 transmits a 17-bit code. Thus, the total number of memory locations addressable is $2^{17}$ (131,072). However, the memory unit 10 will not necessarily have that many locations, i.e., not all locations which are unambiguously definably by a seventeen bit code have to be implemented, as it may not be necessary or economical to have that many memory locations for a particular computer. Flexibility in memory size is very often essential to meet price considerations.

As stated, a data word read and/or to be recorded is held in the memory M register 16. M register output channels 18 receive a word from the memory M register 16 for delivery to the central processing unit 100, M register input channels 17 receive a word from the central processing unit 100 for subsequent storage in the core memory. In the general case a word read from memory will pass from the M register via channels 18 to a control register C and a word to be stored in the core memory 15 will be provided normally by a processor unit 120. The details and conceivably permissible variations of this unit 120 are of no immediate concern for the present invention. It suffices to state, that the unit 120 includes an adder 121, preferably a parallel adder additively combining two numbers applied to it. One number to be combined is held in the D register coupled serially to the C register to receive a number therefrom, as it was received from memory. The other number to be added is held in the A register which is the temporary operating accumulator register. The output of the adder is either recirculated by a channel 122 as is necessary in case of multiplication or division, or the sum (or difference) is set into a data output bus 175. The processing unit 120 performs other functions such as forming the inversion of a number word, changing its sign, determining which one of two numbers (again held in A and D registers) is larger or smaller, or whether they are equal or unequal. If the result of such operation is a number, such number will be applied either to bus 175 or to bus 17, the latter for those cases in which the result is to be transferred into the core memory 15.

The unit 120 may also operate as mere transfer unit for those cases in which a word which for some reason has been set into A or D registers, is to be transferred into memory and then the word will be set into output bus 17 or 175, as the case may be. The purpose of bus 175 will be described next.

We now proceed to the description of the fast access memory 150 in CPU-100. The fast memory unit has two portions, 160 and 180 and portion 160 will be described first. The storage locations of the fast access memory are comprised of registers such as 160-1, 160-2, . . . , 160-16 and others etc. These memory registers are organized in groups or blocks of 16 registers per block. The organization is not a physical one but relates strictly to a grouping of registers by assignment of register address codes in accordance with a particular pattern. Each block is comprised of 16 memory registers. In FIG. 1, the blocks are denoted with 161, 162 . . . , **16*n*. Registers 160-1, 160-2 or 160-16 pertain to the page 161**, the other blocks also have 16 registers each. Each register of these blocks has 32 bistable stages (flip-flops) preferably provided in groups of integrated circuit units. Each flip-flop constitutes the individual fast access storage cells. Each register is individually accessible to either receive a new order or to permit copying of its content into a different register. Readout of a register is a non-destructive process. Access is available in about 150 nanoseconds.

The registers of register memory 160 have a common data output bus 170 and a common data input bus which is the bus 175, of 32 bit channels each, one per bit. A common input bus and a common output bus is permissible as only one register at a time is alerted to either receive a word to have its content copied. Normally, the source for a word to be recorded into a memory register will be the processing unit 120, so that the principal feeder for the data bus 175 for the memory registers is this unit 120.

The immediate destination of a word to be copied from a memory register will be either the register A or the C register. Accordingly, a branch channel 171 leads from output bus 170 to the A register and a branch channel 172 leads from bus 170 to the C register. The A register is the operating accumulator register, and the memory register feeding its content at any instant into the A register, is the current accumulator proper. The C register, as was mentioned above, is the register in the CPU which receives data from the core memory 15. Since the register memory 160 can also be regarded as memory locations, data may be set from such a location also in the C register.

Each memory register is identified by a nine-bit address code. This code or address number results from concatenation of two sub-codes, respectively identifying a block to which the register belongs, and a register within the block. As each block has 16 registers, a four-bit in-block code is required to identify a particular register in any block. A block as such is thus identified by a five-bit code. This block code is held in a block pointer register 151 which is a part of the fast memory addressing system, but can also be regarded as part of the fast memory itself, though outside of the grouping into blocks.

The five-bit word concurrently held in the block pointer register 151 is decoded in a decoding assembly 152 to provide block identification or call signals, i.e., to "point" to a particular block-code-identified group of memory registers. A change in the code held in register 151 results in a "pointing" to a different block. The decoder 152 has an many output channels 153 as there are implemented blocks. An enabling signal in any channel 153 is the result of the decoding of a block pointing address code and alerts preliminarily the 16 memory registers which pertain to a block Each block has a within-block decoder which is alerted by the respectively decoded block pointing code. Only the decoder 154 for block 161 is illustrated as an example for a within-block decoder. In addition to the decoded page pointing code, each within-block decoder responds to 16 different four-bit codes, for distinguishing among the registers in a block. Accordingly, there is provided a four-bit line in-page addressing bus 115. A particular bit combination in bus 115 will result in the addressing or accessing of but one memory register within the addressed block.

As stated the address of a memory register is a nine-bit number or code, five high order bits identify a block, and the four least significant bits identify the register within a block. This provides an addressing continuum of $2^9$ registers. One can consider this continuum as part of the major addressing continuum for the memory in this manner: One can take the nine-bit memory register addressing code, and one can further select an eight-bit number, and the two numbers are concatenated to form a 17-bit address code within the addressing continuum of the core memory addressing system. If this eight-bit number is selected as the most significant address code portion, and if not all $2^{17}$ memory locations in the core memory are implemented, an overlap (shadowing) between core memory addresses and fast memory addresses can be avoided. However, the addressing continuum, and the length of an address number for the core memory has been selected from the viewpoint of potential implementation of each core memory location definable within the 17-bit continuum. Thus, the interpretation of a fast memory register address within the same continuum used for identifying locations in the core memory, poses problems to be dealt with in detail below.

Figure 2:
FIG. 2 illustrates schematically the format of the principal instruction word used in the computer which is the subject of the present invention.

Returning now to the memory register address code as defined by concatenating a block pointer address number and an in-block number, it can be seen that the block pointer code can be set into register 151 and maintained therein for any desired duration, while the four least significant bits for in-block decoding are changed independently. This is significant for programming purposes as it permits the assignment of in-block codes for specific tasks independent from any particular block employed. This in turn permits utilization of memory registers as operating registers requiring only the abbreviated four-bit within-block code for particular identification as long as it is understood that the full memory register code can be established by the readily available block pointer code. We now turn to one of the two instruction word formats employed. The normal instruction word has four fields, as symbolically represented in FIG. 2. The instruction word has the normal format of 32 bits as used for all words.

The operation code or OP field designates i.e., it identifies in binary code (without numerical significance) the specific operation to be performed, including a designation whether or not indirect addressing is to be invoked. This field may be comprised of eight bits representing the operating or control code. The R field has four bits, and any four-bit code here designates one of the 16 memory registers of the block identified by the current content of the pointer register 151. Thus, the R field defines an in-block code, to be supplemented for complete addressing of the memory register involved by the block pointer code held in register 151. The thus identified memory register may serve as operand source or as operand destination, or both, depending upon the type of operation desired. For those types of operations which do not require the participation of a memory register as identified by an R field code or which per se involve specific memory registers of the current block, the R field of the instruction word is free to be used for other purposes, and to be decoded accordingly.

The X field has three bits and designates one out of seven of the 16 registers of the current block, and the thus identified register is to serve as an index register. *X* = 000 impliedly identifies the first register of the block, but is used specifically as an indication that the instruction is to be executed without indexing, so that in fact this first register of any block is not available as index register.

The remaining 17 bits of the instruction word occupy the MA field to identify a memory address to the word level. The association between this code in the MA field and either the core memory or the fast memory will also be described below. For the moment, we refer to the core memory only and it is permitted to think at least as one possibility that the address in the MA field directly defines a core memory location. Thus, within one instruction word, three different memory address locations are identified as it is understood that whenever the instruction word is to become operative, a block pointer code is available in register 151 to supplement the codes in the R and X fields.

In another case of operations, immediate operands may be provided within the instruction word. For a particular class of operating codes the concatenated X and MA fields are not interpreted as addresses but as an operand of immediate numerical significance. However, the OP and R fields are not affected by this different format and serve the same purpose as described above.

Bearing these remarks in mind, it is apparent that the several bits and fields of an instruction word require different handling after an instruction word has been read from memory and loaded in the C-register of the CPU-100, as the C register is the principal receiving register for the CPU as far as data flow from memory is concerned. The entire instruction word, i.e., its OP, R, X and MA fields may be transferred immediately into a D register. Words to be processed are usually held in the D register. As far as the instruction word is concerned, only the MA field thereof a held as the D register is utilized further with the aid of the D register. The OP, X and R fields of an instruction word are concurrently set from the C register into three registers bearing the respective field designation.

It will be appreciated, that the OP, R and X registers together with the portion of the D register holding the MA field of an instruction word can be regarded as the instruction register, which thus is not an individual unit of separate significance. The D register holds the MA field only temporarily, as the addressing number for the operand has to be transferred to a P register. This process will be described below, and once the operand address has been set into the P register, the D register is free to receive other data including numbers involved in the execution of the current instruction. The OP, R and X registers hold their content throughout the execution of the current instruction.

The OP-register holds the eight-bit operand code of the instruction word. This operating code will be applied to an operating code decoder 111. This network 111 will not be described in detail as it performs basically standard computer operations, and only those operating substeps having to do with the inventive improvement will be referred to in some detail. Basically, unit 111 responds to the particular operating code held in the OP register to provide control signals necessary to control the particular operation identified by the operating code. In most instances this will involve the processor 120.

The operate code decoder 111 closely cooperates with a timing and phasing unit 114. The orderly sequence of the several operations for executing an instruction will be controlled by timing and phasing unit 114 organizing in time the sequence of operational steps in the computer and establishing operating phases which restrict operation and disable some circuit elements during certain periods, while other elements are enabled concurrently to remain so only for predetermined periods of time. An orderly sequence of operational steps is insured and the particular aspects of interest will be described next.

It has to be remembered that when the OP register receives an operating code, the D register does not hold an operand, but the instruction word. The operand may be set into the D register in a later phase which is part of the execution of the instruction. Thus, in many cases the operation, for example, an arithmetic operation, will not be carried out immediately, so that the placing of the operand into the D register and its subsequent processing must be sequenced. An example will be described later on in greater detail. The operate code remains in the OP register throughout the execution of an instruction.

The R register holds the bits of the R field of an instruction word after same has been received from the memory. The output side of the R register feeds a channel 112 which may include an enabling gate assembly. Channel 112 has four-bit lines leading to the fast memory, in block addressing bus 115. Channel 112 is blocked completely if the R field does not designate a register within a block, otherwise channel 112 is open during a particular phase or phases of instruction to feed bus 115. As this is decided in response to the current operating code, an enabling signal $0_2$ for the gates in channel 112 is drawn from the timing and phasing unit 114 if the decoder 111 so permits.

At times it may be necessary to modify the content of the R register which designates a particular register in the current pages. A particular operation as required by an instruction may, for example, require participation of more than one memory register as current accumulator. Thus, it may become necessary to address also, for example, the register having the next higher or the next lower in-block address code number. Thus, there is a channel 116 for incrementing or decrementing the number held in the R register by one. This operation will strictly be controlled from the networks 111 and 114, as only particular ones of the operate code require this step.

The X register holds the three bits of the X field of an instruction word. The content of this register section or X register defines the memory register in the current block holding numbers used for indexing. The output of the X register feeds a three-bit line constituting a channel 113. This channel feeds also into the in-block addressing bus 115. Since the full address of a memory register requires nine digits, with five digits being furnished by the pointer register 151, one-bit line of bus 115 must receive automatically a zero bit when the three-bit code of the X register is fed into bus 115. Channel 113 is blocked if the X field does not designate one of the seven possible registers within the current block to be used for indexing.

Since indexing must occur within a certain period after an instruction word has been set into D register, an enabling signal $0_1$ for gate 113 is also drawn from the timing and phasing unit 114. Since an X code (0.0.0 ) indicates: no indexing, a recognition of this particular number in the X register by a detector 117 will result in an inhibition, either of the production or of the effectiveness of phase signal $0_1$ and other controlling the indexing operation.

As R and X registers each may hold a code concurrently because the current instruction has both an R and X field, the respective outputs of the two register portions must not be fed concurrently into in-block addressing bus lines 115. The phasing and timing unit 114 provides first a phasing signal $0_1$ to the channel 113 for enabling same for purposes of controlling indexing, and subsequently for a different operation the phasing signal $0_2$ will open channel 112, whereby, of course, $0_1 \cdot 0_2$ is never true. These phasing signals may be provided in fixed time relation to the time an instruction word has been loaded into the D register.

The R and X registers respectively provide four-bit codes and three-bit codes, each being register identifying signals having operative significance only in conjunction with the current block pointer address as held in the register 151 to address a specific memory register within the block "pointed to" by the block pointer register 151.

From the description of the instruction word format it is apparent, that no specific memory register appears to be defined by the R and X fields in an instruction. A memory register when used as accumulator extension register appears in the program only as a particular one within a block. The particular block is not specifically identified in the individual instruction word but is understood to be the current block. By selecting a particular R and/or X code, one memory register of the current block is thus assigned to a specific task and it can be a particular one in any block.

The programmer is, of course, aware which particular memory register is involved, as for each program portion a block pointer code is held in register 151. The loading of the register 151 with the appropriate code precedes the execution of all instructions requiring a particular block. Thus, there is a particular instruction provided for called "load block pointer," the execution of which causes loading of the register 151. As stated, the block pointer code is a five-bit number. Such a number will occupy particular bit positions of an operand word drawn from memory for loading or reloading register 151. This word will first appear in the D-register, and then the portion thereof representing pointer code passes into register via lines 155, by operation of the decoder 111 and phasing unit 114. There are other instructions to be described more fully below which cause a change in the block pointer code together with a change of other codes.

It is thus apparent that pursuant to execution of a sequence of instructions, different memory registers will be addressed. The pointer code needed for supplementing the R and X fields is maintained in register 151 throughout a sequence of instructions successively drawn from the core memory and executed in like sequence. The in-block code is held in the X and R registers, the content of which may vary for each instruction. Whether the participation of the addressed memory register results in an indexing or in any other logic or arithmetic operation depends on the phasing control. The addressing of any one memory register within a block is independent of the interpretation and subsequent use of the content thereof.

The fast memory is addressable in the alternative as memory by deriving an in-block code from a bus 134 which is another feeder channel for bus 115. This situation arises in a manner described more fully below, but it is pointed out presently, that X and R registers are not the exclusive sources for in-block codes and memory register addressing.

The addressing of a specific memory register will include a general alerting of this register. Each memory register has 32 parallel input channels, leading to data bus 175, and there are 32 parallel output channels leading to data bus 170, for respectively loading the alerted register or copying its content. The addressing of a memory register constitutes an enabling of the 32 input and/or output channels, one input and one output channel for each register stage.

As a memory register is addressed, its content is applied to the data bus 170 and permits withdrawal therefrom. The bus 170 has two branches 171 and 172. The branch 171 leads to the operating accumulator register A. Whether or not, and at what instant the data in channel 171 are clocked into register A is determined by the phasing unit 114 and the operate code decoder 111. Since a memory register is addressed as accumulator extension from R and X registers, and by operation of the signals $0_1$ and $0_2$, the same signals will be used as gating signals for channel 171. This channel 171 makes it possible to consider all memory registers 160 as accumulator extension. As far as the programmer is concerned, any word held in the current page is regarded as being in the accumulator, and channel 171 realizes this concept, by providing a transfer (copying) of a word from a memory register to the A register, of which transfer the programmer is not aware because it does not require any special instruction.

The conventional accumulator always required transfer of a word from the regular (core) memory to the accumulator, such as an A register as a separate operating step. The operative connection between A register and fast memory renders the content of an X or R field identified memory register immediately available in the A register without such operating step because the concurrently identified core memory address of the MA field of the same instruction word requires a longer access time than the time it takes to transfer a word between two registers.

Each memory register can thus be regarded as a portion of the accumulator. The content of the memory register is available in the accumulator proper because the "swapping" of data between the temporary accumulator which is register A and its extensions, i.e., the memory register, is considerably faster than the transfer of data to and from a core memory, so that in case of an arithmetical operation such transfer is possible and will be completed during the same core memory cycle which calls on the second number from the core memory.

The second branch 172 leads into the C register as an alternative input thereof. It will be recalled, that channel 18 serves to pass data received from the core memory (M register) into the C register. The branch channel 172 is the analogous feeder line when the alerted memory register is regarded as a memory location, and in this case transfer into the C register is necessary to thereafter handle the word independent from the fact whether it was withdrawn from fast or from slow access memory. The channel 172 will, in general be used in those cases, in which a memory register was not addressed via codes held in X and R registers, but via the memory addressing bus 134. Thus, whenever bus 134 is enabled, channel 172 will be likewise. The process of copying the content of a fast memory register into the C register is again controlled from phasing unit 114 by a phasing signal $0_6$. This signal is developed independently from the operate code decoder, as the location of the data word in memory has basically nothing to do with the operation performed on such a word. The phasing signal $0_6$ is developed when an operand location identified by the MA field of an instruction word is not found in the core memory.

The particular memory registers identified by the content of X and R registers in conjunction with the current page pointer code held in register 151 is coupled to the A register for fast data transfer thereto.

By changing the pointer code in register 151 the register of the prior block become strictly memory locations, and the registers of the newly addressed block become accumulator extensions available for immediate access. Any transfer instructions as between core memory and the processor actually is thus a relocating operation as between the memory taken as a whole and the pointer code simply determines which memory portion is currently available as accumulator processor extension.

In the normal case an arithmetic type processing will thus involve a word which has been passed from one of the R field identified memory registers of the current block into the A register and a second word drawn from any memory location and held in the C register for arithmetic combination with the word then in the A register. The result will then be passed into channel 175 for return to the R field identified memory register. For example, an adding instruction will identify in its R field a memory register pertaining to the current block; this identifies the augend. The instruction will further identify a memory location holding the addend. Upon execution of this instruction, the augend is loaded into the A register and the addend is loaded in the C register. The numbers will be added by adder 121 and still subsequently the sum is returned to the memory register from which the augend was drawn.

The A register and the adder 121 will also be used for indexing operations. Indexing is the modification of the address of an instruction word by adding thereto a number to obtain a new address, and the instruction will be executed with the word held in the thus modified address. This indexing process involves one of the seven registers of the current block as identified by the X field code of the instruction word currently held in the D register. The content of this latter memory register is an index number and is placed into the A register, the code as originally set into the MA portion of the D register is added to the index number, and is shifted through a branch channel 176 to the P register. Only the thus modified address is subsequently used for memory addressing. With this, we proceed to the description of the addressing control system within CPU-100. The central addressing register for the memory as memory is this P register. This register receives memory address codes from three sources.

The first source is the D register, and particularly those stages which hold an address field (MA) of an instruction word. There is a channel 131 accordingly for bit transfer of an address code in parallel from the D register to the P register. This transfer, however, is inhibited when indexing is necessary. An instruction word, it will be recalled, after having been set into the C register from memory is passed on to the D register and portions thereof are also set into the R, X and OP registers. The detector 117 determines whether or not there is to be indexing. If not, the X field is (000) and this is used by detector 117 to open the channel 131. Any other content of the X register closes the channel 131.

The second input for the P register was introduced above, it is the output branch channel 176 from the processor 120 used, for example, after indexing whereby the MA field in the D register was modified. The channel or bus 176 then holds the arithmetic result of the indexing operation.

The third input for the P register, is a program counter register or Q register 140. The number held in the Q register is the program address defining the location which holds the next instruction in the regular sequence of executing a program. This memory addressing number is first passed from the Q register to the P register via channels 132. The number is then copied into the memory accessing network to be described below. Now the address number for the next instruction must be formed or drawn from some source. Instructions to be executed in sequence are usually programmed for storage in memory locations having consecutive addressing numbers. Hence, the addressing number held in the P register will be incremented by one; line 145 denotes this symbolically, and this new number is then set as the next instruction location into the Q register via channels 141, to be held in the Q register until being called upon or substituted. In the meantime, the P register will receive other address numbers, such as the MA field of an instruction word.

All these steps will be controlled by the timing and phasing unit 114. However, the inventive system is not tied to this particular type program sequencing, and it is understood that the Q register holds the memory address number defining the location from which the next instruction is to be drawn regardless of how this number was formed. Subsequent to the execution of the current instruction, the new address number will be loaded from the Q register into the P register to identify the location holding the next program step; whether this new address differs by unity from the previous one or has been arrived at otherwise is immaterial here.

In case of program branching, interrupt operations or indirect addressing the respective next instruction location is not the one held in the Q register but is set into the P register from different sources; usually it will be the D register or the bus 176 having received such new addressing number by processing operations, from memory, etc. This number when set into the P register determines the next instruction location, is incremented by one and the new number is again set into the Q register as substitution of the previous content thereof, so that now the program continues from a different spot.

Any memory location to be addressed is held in the P register and for all cases of memory accessing which are controlled by and from the CPU. Thus, in general, memory addressing will alternate between accessing the location defined by the program counter on one hand, and the location defined by the address either held in the MA field portion of the D register before indexing, or applied to bus 176 after indexing, on the other hand. In summary: at the end of executing an instruction and after incrementing of the program count number held in the Q register, a phase signal $0_4$ from unit 114 opens the channel 132 to pass the new address code number to the P register. Subsequently to the loading of an instruction word into the D register, the system passes through a phase $0_5$ during which the operand address is passed either from channel 176 or from channel 131 into the P register; which channel depends upon the presence or absence of indexing. $0_4 \cdot 0_5$ is, of course, never true as the source for the memory address must be unambiguous.

Any address code which has been set into the P register is first passed into a branching network 133 having the following function. The address code number in decimal expansion may have a value between 0 and 15. For a 17 bit address location number format, this means that the 13 most significant bits have all bit value zero, and the four least significant bits define a number between (decimal) 0 and 15. If the separator 133 detects the zeros in the 13 most significant bit positions it feeds the four least significant bits to lines 134 which feeds into the in-block addressing bus 115. If the 13 most significant bits are not all zeros, then the addressing number passes into channel 133'. The function of channel or lines 134 shall be described first. As this involves a fast memory cycle, the effectiveness of lines of channel 134 may be additionally dependent upon phasing and gating to exclude any other memory register subcodes from passage to bus 115. It can thus be seen, that the detection of zero bits in the 13 most significant positions of an addressing number in the P register is the condition for the development of the phasing signal $0_6$.

The four least significant bits in channel 134 denote a particular memory register, and these four bits can be interpreted by themselves, as being analogous to any four-bit code held in the R or X registers. One of the blocks is enabled from the page pointer register 151 at any time, and these four bits in line 134 taken together with the current block pointer address thus defines now an individual register within this current base.

It thus appears, that a memory register, i.e., a location in the fast memory can be addressed in a three-fold manner, i.e., a memory register address can be concatenated in three different ways. The first mode of accessing calls for a combining of the current block pointer code as held in register 151 with the content of the R register. For indexing the same block pointer code is combined with the content of the X register, which constitutes the second mode.

Thirdly, a memory register of the current block can be addressed when the 13 high order bits of an address held in the P register are all zeros, and the four low order bits are concatenated with the current block pointer code to form a memory register address instead of a core memory address. Thus, it is significant that the core memory locations having an address expressible as one of the decimal numbers 0 and 15 is shaded. Shading of an address means that the particular memory location cannot be reached by placing the addressing number into register P.

The shading of a portion of the core memory, however, does not mean that these particular core memory locations cannot be arrived at at all. With this we proceed to the alternative branch output of separator 133 having output channel 133' and providing the input circuit for core memory access control. An address code will appear in this channel (the normal case) when not identifying location 0 and 15. The addressing of the core memory requires an analytical distinction between a program address and a memory address. A program address is sometimes called virtual address, and the memory address is called the actual address. The program counter 140 (Q register) and the MA field furnish program addresses. The program or virtual addresses are selected to store control information and numerical data, and they are so assigned by human or compiler effort to compose a computer program.

Often a computer must handle, for example on a time sharing basis, a large number of different programs in a manner which can also be described as program multiplexing or multiprogramming whereby a changeover from one program to another is determined not on a fixed time basis, though this is possible, but on a basis of priorities. On the other hand, not all programs to be handled over a relatively long period of time can be stored in the core memory, as the core memory is mostly too small. Cheaper memory expansion devices such as drums, disks, tapes, etc. are used, and during operation programs are swapped between the core memory and the expansion devices. This, in turn, may result in an overlap of address names particularly if the total number of memory address locations to accommodate all data of all programs is larger than the number of available and implemented core memory locations. The total number of required address locations to accommodate all programs may even be larger than the number of potential memory addresses in the entire address continuum as defined by the length of addressing numbers. Moreover, the computer may be used by different users, each writing his own program and, of course, each program when written requires labelling of the locations where all the instructions and operands are to be stored in memory. As these programs may be written independently by the different users overlap of programmed addresses becomes inevitable.

One could assign to each user a particular portion of the memory, but this is unsatisfactory as it may restrict his programming. Moreover, a user may require service of the computer rather infrequently, so that the memory portion assigned to him would be idle most of the time. Thus, the different users sharing a computer should thereby share computer space. Each user thus should be put in a position enabling him to program the entire computer at maximum capacity thereof. Without further measures, this would mean, that during a certain period of time, different users could share the computer memory space only to the extent that for a given period of time each user could use only a particular space in a manner which does not conflict with other users. This is unsatisfactory as it dictates priorities of program execution as to each user.

All these problems can be solved if the computer has the capability to manage the storage into the memory locations in a manner which permits deviation from the program addresses. Efficient time sharing of the computer requires concurrent residency of programs of different users in the core memory permitting each user to determine independently the priority of program execution with programs of lesser priority being loaded in memory expansion devices. Thus, it may become necessary to put a program into memory locations different from the locations contemplated by the programmer, without however disturbing performance. Furthermore, a program usually requires contiguity at least of the locations receiving the sequentially executed instructions and called upon by the program counter in that sequence. At any given time when a particular program is to be swapped into the core memory such contiguous space may not be available. Thus the core memory is fragmented by dividing it into equal pages, each having for example 512 (equal to $2^9$) memory locations. At the chosen seventeen bit memory address code, the word memory or in-page addresses can be considered as occupying the nine low order bits, so that the eight high order bits can be construed as page memory addresses. Thus, the fragmentization of the core memory is not a physical partitioning, but a soft ware principal of organizing the available storage space. As a program is loaded into the memory, it is placed not necessarily into the address locations as assigned, but as they are available. A program may be and actually will be entirely contiguous as far as the contemplated program address is concerned. In many instances a program requires several pages. The actual memory location assigned to it and operated within this particular program may thus be pagewise scattered over the core memory just as there is space available. It follows that for actual memory access the eight high order bits of a program address must be disregarded and a new page address is substituted. Thus program page address codes and memory page address codes are exchanged in a preassigned manner which is called mapping. During operation, i.e., while running any program, the nine low order bits of the address are not changed (except indexing which has nothing to do with the location problem), but the eight high order bits of a program block address as it appears, for example, in channel 133' will be exchanged for a memory page address.

The exchange of a program page address for a memory page address is controlled by means of a second fast access type memory portion 180 constituting a map. This map includes the registers 181, 182, 183 up to 18M with M being $2^8$ (=256). Each of these mapping registers can be loaded with a memory page address code. Each mapping register is individually addressable by a program page address, i.e., by the eight high order bits as presented by the P register.

A portion of the core memory will usually be occupied by an executive routine which is principally concerned with control. This routine will include special instructions to the effect of loading the mapping registers 181, 182, etc., with numbers identifying memory pages. This loading process will be described below. The numbers constituting the several memory page addresses will be stored in the memory as part of one or several routines which, in addition, include instructions to the effect of associating program page addresses and memory page addresses. Additionally, or in the alternative, the memory page addresses may be derived from an external source through input-output operations.

In case the several programs are resident in the core memory, they may have overlapping program addresses, i.e., at least one common program page address. During execution of either program the same map register will be addressed but should provide different memory page addresses depending on the particular program concerned. Thus, for this case, an exchange of the memory page address in that particular program page identified map register is necessary to properly associate the program address of each particular program with its memory page address or addresses. Thus, different programs cannot be run alternatingly without changing the content of the particular mapping register the addressing page code of which is a common page program address for the different programs. However, the rewriting of the map in between the change from execution of one program to the other is a considerable faster process than swapping of entire programs between memory proper and memory extension devices, so that mapping is a true speed up of multiprogramming and time sharing multi-usage of the computer. The process of map writing and rewriting will be described more fully below, and presently we proceed to the memory control operation using the loaded map.

As the fast-slow separator 133 has decided that the program address, as indexed if there was indexing, is located in the core memory, the 17-bit program or virtual address is split up; the nine low order or word address bits are passed into channel 136 as the mapping will not affect them. The eight high order bits constituting the program page address are passed into channels 137 and 142. It is not mandatory that the map is being used, and a status controller 135 stores and provides distinguishing control signals in dependence upon the condition of whether or not the map is to be used.

The controller 135 may be a flip-flop opening the two channels 137 and 142 in the alternative depending upon the particular state of the flip-flop at the particular time of the addressing operation. When mapping is used, the program page address passes through channels 137 to a page address decoder 195; when mapping is not used, the program page address passes to channels 142 and thereby becomes a memory page address.

The program page address decoder 195, alerts the respectively addressed mapping register, and the latter then feeds the memory page address it holds to a memory page address bus 196. Whether or not the page address in bus 196 can actually serve for memory addressing depends now on the outcome of a test.

As stated the principal point of using the map is multiple programming of a computer, requiring residency of different programs with similar program addresses in the memory. One of the reasons for providing the map is the considerable use of the computer by different users leasing "time slots" for computer operation time. For this contemplated type of operation and use, it is necessary to prevent interference between the several programs and unauthorized access to the program of another. Thus a protection is needed in the sense that a program as currently executed should not automatically have access to all parts of the memory.

With this we turn to a set of control registers 180*a* comprising registers 181*a*, 182*a* - - - 18Ma with $M = 2^8$. These registers each have two stages and are respectively associated with the mapping registers of corresponding number designation. The two-bit code held in such a control register is an access control code for the program page. The following distinction must be carefully made, a particular program page addressing code will be shared by different programs but at different times so that different programs of different users will require at different times utilization of the same mapping register together with the associated control code register. The code held in a control register at any time is uniquely associated with the program of the particular user then using that particular point of registers comprising a map register and access control register. Thus, the access code for that program page may vary, so that it is meaningful to associate a particular program page with a selectable access code. The code in the particular access control register will be changed as, due to multiple programming, the same program page is used for different programs.

It was found to be meaningful to use the following access control functions to be identified, for example, by the following control codes:

00; the program can write into, read from or access instructions from the page of program addresses. Thus this code does not inhibit anything.

11; no access whatever is permitted to the page. This is the principal protecting code ensuring complete privacy to the user whose program occupies the particular memory page, the memory page addressing code of which is held in the mapping register which in turn is associated with control register storing this particular access code.

01; the program cannot write into, but can read anything, including instructions, from this page. This is a particularly useful access control code as it permits common use of this program page by all programs, except that a user is not permitted to alter anything therein. For example, the program page may hold arithmetic subroutines to provide, for example, iterative integration, development of power series for approximating algebraic functions, storage of commonly used reference data not to be updated or tampered with by users, etc. Of course, such common programs can be altered if necessary by changing the access control code.

10; the program cannot write into or access instructions from the page, but can read therefrom information other than instructions. One will use this access control code, for example, in case a program page contains data and, for example, instructions for updating such data. The data may be used by all users but updating is permitted only by an executive or master routine, which when executed is then accompanied by a different protect code. It is an important aspect that normally users of the computer are not enabled to include in their program instructions to the effect of changing the access control code.

The access control codes are correlated in a testing device 197 with signals representing the purpose of the desired access. As program page address decoder 195 accesses a mapping register, for example register 181, etc., it also accesses the respectively associated access code control register 181a, feeding the respective control code to the testing device 197. In the normal case, the accessing of such a pair of registers is done as one of the steps to gain access to a particular memory location, and this access has a purpose. The testing device 197 receives also information, for example, from the memory read-write control 14, whether the contemplated memory access is for purposes of reading from or writing into a memory location pertaining to the memory page identified by the eight-bit code in channel or bus 196. As symbolically represented by a signal $0_4$ the withdrawal of instructions pursuant to program counter advance is phased by the signal $0_4$ or by a signal having a fixed phase relation to $0_4$ so that this signal can be regarded as representative of the fact that the present memory accessing step is done for purposes of withdrawing an instruction word therefrom. As explained previously, $0_4$ controls the program operation for loading a program address into register P for purposes of withdrawing the next instruction of the program from memory.

Detecting device 197 now controls the inhibition of the transfer to the memory page address code from the accessed mapping register by referencing, if necessary, the respectively associated access control code against the signal identifying the purpose of the contemplated access step. For an access control code 00 there is no inhibition whatsoever so that the "access purpose of defining" signals applied for device 197 are disregarded. For an access control code 11 there is inhibition regardless of the purpose of the access. For a code 01 a contemplated writing will be inhibited but not reading and for code 10 writing or instruction withdrawal is inhibited but not reading of information other than instructions.

Any inhibition has two affects. One is that the memory page address code will not be transferred to the bus 199. The other effect is a triggering of a trap control 139. The trap control device 139 when triggered causes a particular memory address code to be set directly into the register 12. The memory address location as thus accessed contains the beginning of a subroutine to deal with this error situation; this is a matter of programming to provide for a trapping of the computer. In the most simple form it may halt the computer or it may cause print out of a representation to the extent informing the operator that for reason of the trap the present program is discontinued and the computer may then proceed on a different program.

The map may not always be used,particularly not when the programs happen not to overlap, and when there is no multi-usage, so that there is no need for blocking parts of the memory from unauthorized uses. However, it is still often desired to prevent the destruction or change of data in a memory page. For this the computer is devised with a "lock" and "key" system. The "lock" is in a lock register assembly 190 having $2^8$ registers each having two stages. Each two stage lock register is associated with a memory page. Thus, each such register is addressable by the corresponding memory page address code. The "lock" for a page is defined by a two-bit "lock" code held in the lock register to operate as lock for the associated memory page. Normally, a particular lock register will be loaded with a code at the time when data are loaded into the respectively associated memory page. The loading process of these lock registers will be described below.

A "key" is to be understood to be a two-bit code and is held in a single, two stage key register 193. The "-key" code is set into register 193 prior to executing a program, or, more precisely, at the beginning of execution of a program and pursuant to execution of either one of the two instructions: XPSD and LPSD which will be described more fully below. It can be said presently, however, that the loading or changing of the key can concur with the loading or changing of the content of the block pointer register 151. In any event the normal program when executed is always accompanied by the presence of a "key" code in two stage register 193.

The memory page address in channels or bus 199, is provided by the mapping register output bus 196 or by channel 142. This page address is decoded in decoder 192 to provide access to the respective "lock" register, and a comparator 194 now compares "lock" and "key" codes. This comparison is carried out in accordance with the following pattern which can be realized by simple logic circuitry:

When the "lock" code is 00, no restrictions are imposed regardless to the "key" code, so that a memory page with a "lock" code "00" is "open". The same holds true when the "key" code in register 193 is 00 regardless of the content of the lock register. Thus a "lock" 00 is "opened" by any "key", and a "key" 00 "opens" any "lock".

If the lock code is other than 00, i.e., 01, 10 or 11, then writing into the memory page is permitted only when the key code held in register 193 is identical with the "lock" code. Thus when the "lock" and "key" codes are unequal, and both are unequal "00", the memory page cannot be written into.

The same write signal which triggers the access control device 197 previously described, can now be applied to comparator 194 to cause blocking of further transmission of a memory page address code in bus 199, and the trap 139 is triggered instead. When the request access to a memory page is not for purposes of writing or when lock and key codes agree or when either lock or key have code 00, the memory page access request can be granted.

It will be noted that in case of mapping and utilization of an access control code in the respectively associated register 180*a*, the additional conduction of the lock and key test is not a redundancy. Thus it cannot be said that in case of access protection by operation of access control devices there is no need for a write lock. True, the access codes 01, 10 and 11 will also prevent writing so that in case of write request there will be no "lock and key" test as the testing device 197 already blocked the transfer of the memory page code from the addressed map register. However, an access control code 00 does not mean that a write request must be honored, the lock and key test may still prevent writing into the memory page. The access code is program oriented and the lock and key code is memory oriented. Access codes, lock codes and key codes can be changed independently so that there is a versatile method to raise or lower barriers for write requests in three different ways and the programmer has a choice among the methods requiring for the particular situation the least number steps.

The output channels 199 of the mapping registers receive the memory page address either from the output bus 196 for the alerted mapping register or directly from bus 142, and after all the tests, as described, have been passed, the memory address proper now results from concatenating the eight-bit number now held in channel 199 and the nine-bit number in channel 136 to thereby define the complete and desired core memory address. The memory address in bus 199 is then subjected to a test as to implementation. It is now being tested whether or not the particular memory address arrived at is in fact in existence in the computer. The testing device 138 is not required if in fact all $2^{17}$ addresses of the addressing continuum are in fact implemented in the core memory. Should the test result in a negative answer, the address will be alerted to provide a particular address code to memory bus 125 and register 12. As the address code now has finally passed all tests, it is fed into register 12, and the memory location thus addressed will now be accessed in the conventional manner to feed its content to the M register.

The address arrived at by mapping may for example have page number (decimalwise) 0 with a word address number (decimal) 0 to 15. As such an address is set into register 12 and applied to the address control 11, it causes accessing of the core memory and not of the memory register in the current page. Thus, the mapping mode permits access to the shaded core memory portion.

Figure 3:
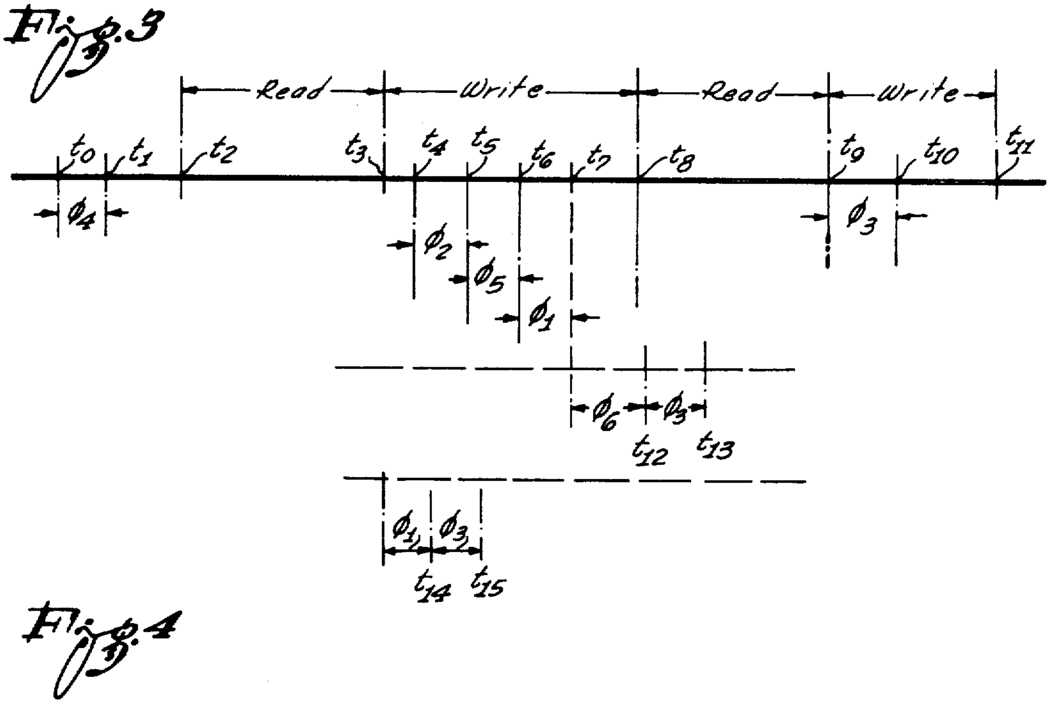
FIG. 3 illustrates by way of example the several phases of an arithmetic adding operation carried out with the system in FIG. 1.

It shall now be explained by way of an example how the inventive system operates with advantage, particularly, to shorten processing time individually as well as in general. Reference is made to the timing diagram of FIG. 3. It shall be assumed that at time $t_0$ the program counter, i.e., the Q register advances by unity and thereby a particular program address is set into it. The phasing control portion 114 now provides the phasing signal $0_4$ to open the passage from the Q register into the P register. At time $t_1$ the address code number is thus applied to separator 133, and it may be assumed further that a core memory address is to be accessed so that the program address number is not between 0 and 15.

The program page address is separated and passed through channel 137 to decoder 195; the alerted map register substitutes its content as memory page address. Concurrently, the corresponding access control register is alerted for comparator 197 to compare the permitted purpose of accessing with the desired one. The desired access is presently for purposes of reading and instruction from memory so that an access control register code of 10 or 11 will inhibit transfer of the memory page address and trap 139 is alerted instead. If the access is permitted, there is no write "lock" and "-key" test, as access is not requested for writing. After the implementation test in device 138 the complete memory address for this particular program address is passed to core memory input bus 125, prior to time $t_2$. At the time $t_2$ execution of the previous instruction has been completed. It should be noted here, that the instants $t_0$ and $t_1$ will generally fall into a memory write cycle during which the content of register 12 must not be changed, but the CPU can already proceed with the necessary preparations for the next step, namely the accessing of the memory location housing the next instruction. At $t_2$ the content held in bus 125 is set into register 12. The now commencing memory read cycle portion will last approximately 400 nanoseconds, so that at the time $t_3$ the content of the addressed memory location which is an instruction word will appear in the M register to be transmitted to the C register, and from there into D, OP, X and R registers, the latter three, of course, receiving their respective portions of the instruction word. The instant $t_3$ also marks the beginning of the memory write cycle. to restore the content in the addressed core memory location.

The instruction word then held in the several registers may, for example, comprise an operating code of an adding operation involving a full word length. Of course, the pointer register 151 holds a code number which identifies the current block and provides for a preparatory enabling signal in one of the lines 153 and for one of the blocks 161, 162, etc. The R field of the instruction is held in the R register and designates a memory register holding the augend for the ensuing adding operation.

The X field of the instruction may designate one of the seven memory registers set aside for holding integers for indexing and it may be assumed that the X field is not zero. Thus, the detector 117 blocks channel 131 to prevent the MA field address code from being set directly into the P register. At a slight delay subsequent to time $t_3$, for example, at time $t_4$ indexing will commence. The pointer register 151 may, for example, hold the code for the first block and decoder 154 is thus enabled. The time $t_4$ will thus mark the beginning of phase $0_2$. The X register is thus permitted to transmit its content to the channels 115, and to the particular memory register involved, for example register 160–2, is accessed.

The phasing signal $0_2$ may also be effective in bus 171 to the effect that the content of the presently alerted index register 160–2 is copied into the A register. At the time $t_5$, the index integer is held in the A register. The phasing unit 114 will provide for signals to adder 121 for controlling a regular adding operating by causing the index integer held in the A register to be added to the bits defining the MA field as it is then held in the D register. Thus, these two numbers are passed through the adder and the addressing code number is modified by the index integer. The resulting new address is applied to the line or data bus 176 to be set into the P register. The phasing signal $0_5$, opens the channel 176 at the instant $t_5$, and at the instant $t_6$ the new address is in the P register. This time is well before the end of the current memory write cycle in which the instruction word is re-recorded in the memory location from which it was drawn.

The time intervals between $t_4$ and $t_5$, and between $t_5$ and $t_6$ each will approximately be 150 to 200 nanoseconds. At time $t_3$ the instruction, here an adding instruction, was set in the several instruction registers; it is thus "known" that an R field, i.e., a memory register of the current block is involved in the execution proper of the current instruction. As stated above, this memory register holds the augend. Thus, at time $t_6$, specifically at the end of indexing and at the end of the necessity for an operative connection of the X register to the fast memory, phase signal $0_1$ will be developed, to open channel 112 to feed the R field code to the in-block bus 115. The block pointer code has not changed, i.e., the same block is being "pointed to" through decoder 152 and the content of the memory register of this block as identified by the four-bit R field code, is loaded into the A register. This operation is terminated at a time $t_7$ which is about 150 to 200 nanoseconds after $t_6$.

In conventional computer operation, the adding instruction usually sets forth that the number held in the accumulator be added to the number held in the address location identified in the address field of the adding instruction word. This pre-supposes the availability of the augend in the accumulator which in turn means that the accumulator must have been loaded with the augend. In the present case, the accumulator, i.e., the A register is empty at the time of detecting the adding instruction order (time $t_3$), but by employing fast memory locations, the augend is set quickly into the accumulator register A to be available at the beginning of the execution proper ($t_8$) of the adding instruction. The accumulator is thus extended to effectively include all fast memory registers as hardware, by operation of software in that the register is identified by a block code and an R field code.

As stated, the indexed memory address for the addend is held in the P register at the time $t_6$ and is split up, the program page address is passed to channel 137, the in-page or word address proper is applied to channel 136, and the appropriate mapping register is accessed; the resulting address is tested as to permissibility of access and now only an access control code 11 would lead to a trap situation. Implementation is also tested and if all tests result in positive answers, the full memory address is now applied to bus 125 to await the termination of the current write cycle (instant $t_8$). This holds true only if the memory program address as it was indexed and held in the P register from time $t_6$ had not a decimal address number in the range of 0 to 15. This alternate situation will be discussed below.

At $t_8$, a new memory cycle begins including the time necessary to clock the memory address for the addend into the register 12. The addend appears in the D register at the time $t_9$ marking the end of the operand (addend) memory address read cycle, and adding may commence to concur with the write cycle portion (beginning at $t_9$) during which the addend is re-recorded into the core memory location. Concurrently thereto, adding is performed, in that the two numbers held in A and D registers are passed through the adder 121 and applied to channels 175. Since by definition the sum is to be placed into the fast memory location from which the augend was drawn, a phasing signal $0_3$ is developed anew to realert this memory register which is still identified by the unchanged R field code in the R register. The augend previously held in this memory register is destroyed and substituted by the sum. This process is terminated at a time $t_{10}$ which is before the time $t_{11}$, marking the end of the write cycle for re-recording the addend.

TAt the instant $t_3$, the CPU–100 "knew" that there is an adding instruction to be executed, and that the time $t_{11}$ will be the instant of completion. Thus, at any time prior to $t_{11}$, preferably during this second write cycle, the operations discussed above to occur between times $t_0$, $t_1$ and $t_2$ will be repeated, so that at the time $t_{11}$, the new memory address holding the next instruction can be clocked into register 12.

Returning now to the adding operation, it shall be assumed that in the alternative, the program address holding the addend (MA field as indexed) has a decimal number of 0 to 15, then the addend is also in the fast memory. This will be detected at the time $t_6$, when after indexing the address for the addend is set into the P register. Equipment wise it is optional to still run through the fixed cycle sequence as dictated by the core memory cycle, and to commence the arithmetic operation only at time $t_8$ and to proceed as aforedescribed. In the alternative, involvement of fast memory affords the opportunity to speed up operation.

At about the time $t_6$ separator 133 will tend to pass the four-low order bits of the address having 13 zeros as high order bits, through channel 134 to the in-block bus 115, but at first, the augend has to be withdrawn from the memory register of the current block and as determined by the R field. Thus, bus 134 can be activated only after the instant $t_7$, when the augend is in the A register. Now, a phasing signal $0_6$ can be developed to access another memory register and to pass its content through channel 172, first into the C register and from there into the D register, this being completed at the time $t_{12}$, being only about 200 nanoseconds or less after the time $t_7$. Hence, arithmetic adding operation proper can commence at that instant $t_{12}$ and may be completed at time $t_{13}$, whereby during the period $t_{12} - t_{13}$ the phasing signal $0_3$ is developed for loading the sum into the R field identified memory register. The separator 133 can be used to provide control signals to the controls unit 114, to modify phasing and timing so as to permit the phasing of the adding operation in relation to time $t_6$ rather than $t_8$. Time $t_{13}$ now marks the termination of the execution of the adding instruction, for this case, and the next memory cycle can begin more than half a core memory cycle earlier.

The adding instruction detected at time $t_3$ may have been of the type in which the concatenated bits in X and M fields of the instruction word define directly an addendnumber. In this case, there will be, of course, no indexing, so that $0_1$ may begin at time $t_3$ to load the augend into the A register by accessing the R field identified memory register of the current block. At time $t_{14}$ the augend is in the A register and the phase $0_3$ will cause adding to be completed at the time $t_{15}$, the sum being stored away in the R field-current block identified memory register. This operation requires thus only a single memory cycle for execution, whereby in particular the arithmetic operation is already completed during the period of re-recording the instruction back into the core memory.

The significance of the operations as aforedescribed is the fact that at the end, $t_{11}$, $t_{13}$ or even $t_{15}$ all operating registers A, C and D hold only such data which can be destroyed; the result of the previous computation, here the sum of an adding operation, is safely stored in a memory register location. Assuming that a subsequent arithmetic operation is required wherein at least one of the operands is held in one of the registers of the current block, then this arithmetic operation does not have to be preceded by a loading instruction as is conventionally required. If in a still subsequent operation the sum formed as was just described is used as another operand, such as a multiplicand, augend, dividend, etc. again such arithmetic operation does not have to be preceded by a loading instruction as the current block is used for such storing of data normally to be stored first in an operating register. Here it is of particular importance, that the fast memory registers play a double role, as they are memory locations and can be interpreted this way by using a memory address identification (MA) of decimal number 0 to 15 or they can be used as operating registers identified by current block code and R field.

Another important aspect of the system is the fact that in case an interrupt occurs during the second memory cycle of the execution as described the interrupt can be responded to already at the latest at time $t_{11}$ (or earlier), i.e., at the end of executing the current instruction without requiring saving operations concerning the content of any operating register. This aspect shall now be described in greater detail.

The interrupt system shall be explained next with reference to FIG. 5. An interrupt system, in general, is used to permit interruption of the currently executed program, if the computer is needed for a task having a priority higher than the current program has. This includes the requirement for establishing different priority levels so that a more urgent request for computer operation can interrupt a less urgent one, but, of course not vice versa.

Interruptions may be initiated internally as well as externally or mixed. The interrupt system is designed, however, so that, for example, for purposes of testing all interrupt channels can be triggered internally, i.e., pursuant to execution of particular instructions. Moreover, the principles of the interrupt device are entirely independent from the signal source furnishing the interrupt request. Thus each interrupt signal channel could be hooked up anywhere.

For purposes of facilitating implementation and wiring, the interrupt channels are divided into groups and some will be wired for receiving internal signals, others for receiving external interruption signals. Briefly, and by way of examples representatively included in FIG. 5, internal interruptions are caused by the following conditions. Should for any reason the power supplying the computer drop for reasons of a power line failure or otherwise, this drop will not occur instantly, but over a period of time during which still enough power is available to run the computer which period can be used to save all those data currently stored in a manner that they would be destroyed when the power goes off, and which data are not available in duplicate or otherwise in an indestructible manner so that they cannot be restored except by starting the program completely anew. Storage in core memory is independent from the power supply. Thus in case of an impending power failure the saving operation will cause data of registers and of control flip-flops to be stored in preassigned core memory locations. This "power fail safe" interrupt has always the highest priority and is to be triggered, for example, by a sensor 201–1 monitoring the voltage level as it exists at the power input of the computer. One could install this externally, for example, at the power house, the distributor line, etc. to catch the power failure at the earliest possible instant.

Internal interrupts will be provided by clocks such as, for example, a clock 201–2. For so-called real time operation it is essential to the computer operation that specific operations thereof occur in synchronization to the lapse of true time. For example, particular outputs must be provided at specific instants, or particular inputs must be sampled at particular instants. Thus an interrupt channel (or several) receive clock signals at regular intervals, for example, one-sixtieth of a second or 125 microseconds. Each clock provides a particular incremental time interval constituting the resolution for periods of time which can be metered by counting the clock pulses. Specific periods will be metered by specially programmed counting subroutines. The clock provide the signals to be counted, and the counting subroutine for metering desired periods must be executed promptly with the occurrence of each clock signal. Thus these clock signals operate as computer interrupts. The clock signals have a high priority in the order of resolution, with the highest resolution clock having the highest next to the power fail safe interrupt. The interrupt routine triggered in response to the occurrence of the clock interrupt will be described below and usually will serve merely to just meter specific periods of time.

When a specific programmable period of time has elapsed as counted, then a resulting signal is used to trigger a second interrupt channel having a lower priority than all clock interrupt channels. Thus after a specific period of time as programmed has been metered as a response to a predetermined number of responses to clock signals, a lower priority channel will be triggered internally from the computer. In FIG. 5 an example is illustrated by a signal line having reference numeral 201–3 and constituting an input for an internally controlled interrupt channel. This interrupt channel has a lower priority than the respectively associated higher priority, clock-signal-metering-interrupt channel such as controlled by the clock 201–2.

Another type of interrupt demands or requests are produced by truly external devices connected to the computer, for example, in case of on-line operations monitoring critical conditions or an external clock; also, the operator panel of the computer is usually equipped with an interrupt switch also constituting an external interrupt channel. An example thereof is symbolically denoted in FIG. 5 with reference number 201–4.

A basic concept of the interrupt device is the utilization of similar modules 200 (200–1, 200–2, etc.) one for each input interrupt channel regardless of the source of the interrupt demand signals. These modules are interconnected in a manner establishing a wired-in priority for each interrupt channel in relation to all others. Furthermore, the modules are designed to permit a programmable change in priority among the several interrupt channels, including a selective disarming (equivalent to disconnection) of a channel except for the power fail safe interrupt which always has the highest priority and cannot be disconnected. Thus, all of the other interrupt channels (including the real time clock metering channels) may be connected in any priority arrangement desired and their respective priorities may be varied by internal programming changes.

Each interrupt module is connected with its output side to the computer and in a manner that any interrupt signal can immediately and directly be identified as to its source without instituting an inquiry. Each interrupt channel is associated with a particular memory interrupt location containing the beginning of an interrupt servicing subroutine associated with the particular interrupt channel and thereby impliedly identifying the source which caused the interrupt.

Each interrupt module has an interrupt signal input line 211 for wiring the module to the device that may issue the interrupt demand or request signal. As stated, this device may be a clock, a switch, a sensor, etc., as outlined above. A second input line 211' serves as alternative input for an interrupt signal for each module permitting triggering of the interrupt internally pursuant to the execution of a particular instruction called "write direct," (WD for short), and which will be described in greater detail below. In FIG. 5 the interrupt control is schematically illustrated by block 250–WD execution control. The same instruction is used for operating the module otherwise. Each module is further addressable by a control 254 pertaining to the central processor and also to be described in greater detail below.

Each module furthermore has an output line 212 which is triggered ro energized when the CPU turns the control of the computer over to the interrupt channel. The lines of the several interrupt modules lead into a control device 202 which can be regarded as a hardware or wired-in source for memory addressing codes. For each interrupt channel and module there is a particular addressing code stored in this device 202, and when an output signal is provided in the particular output line 212 of a module, the respectively associated signal is placed into the register P to cause accessing to the thus identified memory register. The term memory address is used properly here, as the memory accessing step resulting from an interrupt request is not subject to mapping. Thus, the interrupt response will override the mapping controller 135 so that the map is circumvented in case the interrupted program used the map. The memory location thus accessed contains a programmable instruction word to deal with the situation. As stated the programming of these locations impliedly includes the identification of the interrupt source as the instruction word in the respective interrupt location will be programmed commensurate with the expected servicing requirement demanded by the particular source when issuing an interrupt signal to the module to which it is connected. Examples will be described below.

An additional pair of output lines of an interrupt module, lines 215 and 217 define the particular state or condition and of all modules of higher priority for signaling to all modules of lower priority whether or not any of them can honor an interrupt request should such a request occur.

Instruction normally found in an interrupt memory location is called "Exchange Program Status Double Word" or XPSD for short. The execution of this instruction causes actually the interruption of the current program and shifting to a program of higher priority. Before describing this execution, it shall be described what is meant by this Program Status Double Word.

The critical control conditions of the computer can be defined within 64 bits of information which are collectively referred to as the program status double word. This double word has not a single particularly identifiable place in the computer when it defines the current status of the computer, but it comprises the states of a number of flip-flops and register contents which in toto describe fully the operation state of the computer with reference to the current program. All states can be expressed either directly as numbers in some kind of binary type expansion, or just as on-off control states. Thus as the computer operates, at any instant one can define a Program Status Double Word simply by associating the states of several elements in the CPU with particular bit positions. This is purely a matter of definition unrelated with any single identifiable and addressable location where these bits could be found. Only when a Program Status is to be preserved, then these bits will be collected and assembled to form two words to be stored in two memory locations.

At any of these above-defined interruptable points or interrupt time slots the Program Status Double Word defines the current state of the computer to such an extent that an interruption can occur, and the interrupted program can be resumed later on, if the Program Status Double Word as it existed at the time of interrupt can be saved, temporarily stored and redistributed when needed.

The Program Status Double Word thus includes a collection of all those control data stored in circuit elements which likely will participate directly in the execution of the new subroutine following the interruption. Data at any other places forming a part of the interrupted program will not be so affected except if so contemplated by programming the interrupt subroutine. If the latter is not the case, then at an interrupt the data defining the program status double word can be collected, stored in two memory locations, and upon resumption of the interrupted program these data are again redistributed into the elements from which they were collected, and the interrupted program can then be resumed precisely where left off.

It is not necessary here to describe all those data defining a Program Status Double Word and only those pertinent for the invention shall be mentioned. First, part of the Program Status Double Word is the current content of the register Q holding the address of the next instruction for the current program. Thus register Q defines particularly the location from which the interrupted program must proceed after resumption. Next, there is the block pointer code held in the pointer register 151. It defines the current register block, and the substitution of the current pointer code by another one at the beginning of an interrupt servicing routine saves automatically the content of the 16 registers of the current block. It is that particular fact which permits such a fast response to an interrupt request because by saving the current pointer code the current block registers become memory and are effectively removed from the CPU. It will be recalled that the current block registers are definable as accumulator registers and index registers and may even contain data for temporary memory storage and others.

Next, there is the write "key" of the current interrupted program which must be saved. This key is the content of the register 193. Another portion of the Program Status Double Word is the status of flip-flop or map controller 135. The status of element 135 is indicative whether or not the current program is run with mapping. Next there are the bits representing which groups of interrupt modules were inhibited and which not. Other data pertaining to the Program Status Double Word represent particular arithmetical control modes such overflow and testing conditions previously established, etc. It is apparent, that any program can begin by distributing the bits of a Program Status Double Word into the several elements and registers, and since this includes an instruction address in the Q register any program can begin from there. Presently, it is not important to discuss whether or not and to what extent it may be convenient to provide for an individual distribution of the data defining the Program Status Double Word into the several elements and registers, though this is principally possible. For our purpose it suffices to state that the Program Status Double Word for a Program is held in two memory addresses and is read therefrom and distributed into the several elements and registers to begin a program. This may be done by executing an instruction LPSD or pursuant to the second phase of executing the instruction XPSD, the first phase thereof comprises the gathering of data from the several elements and registers of occupancy to assemble the Program Status Double Word of the interrupted Program and loading it into two memory addresses. For execution of an LPSD instruction, just two words are merely distributed in this manner thus destroying the content these elements had just prior to execution of the LPSD instruction. This latter instruction will usually be used at the end of any completed program including an interrupt servicing routine and thereby the Program Status Double Word of the interrupted program is placed back into the several elements to thereby cause resumption of the interrupted program. The details of executing the LPSD instruction are analogous to the second phase of execution of the XPSD instruction and will, therefore, be described summarily below.

We shall now discuss some of the particular which occur when the computer has rendered active an interrupt channel or module and when the respective associated memory locations as now directly accessed contains an instruction word XPSD. The program which was in progress at the time of the interrupt module activation is halted therewith in that the content of register Q cannot be fed into the memory control register 25, instead, the device 202 provides the next address for memory access, as was mentioned above. Mapping, if any, at the time of the interrupt is circumvented.

The content of this directly accessed memory location associated with the activated interrupt module and presumed to be an XPSD instruction word is loaded into the C and D registers, and also distributed to the X, R and OP registers, without disturbing the content of the program counter Q. There will be no indexing (Z field – 000) as all these memory locations involved in the operation are fixedly assigned by programming. The address field (MA field) of this instruction word identifies the first one of four consecutive memory locations. This XPSD instruction is executed during the now following four memory cycles. The first two of such memory cycles define the first phase of execution, and here the Program Status Double Word defining the current state of the computer is stored in two of the four memory locations; the succeeding two memory cycles define the second phase and another Program Status Double Word is withdrawn from the two other memory locations uniquely identifying the initial state of the priority program now to begin.

The first two of these four memory locations referred to above receive among others the following significant codes: In some bit positions of the first memory location there will be stored the 17 bits of the current program counter state which is the content of the Q register as this register was not disturbed at the time of the interrupt. Other bit positions will receive significant state signals of various operating elements characteristically identifying the program and the state of execution at the time the interrupt occurred. This includes particularly the mapping mode control bit held in controller 135, overflow conditions in general and overflow carry or borrow bits in particular as arithmetic status signals, etc.

Figure 5:
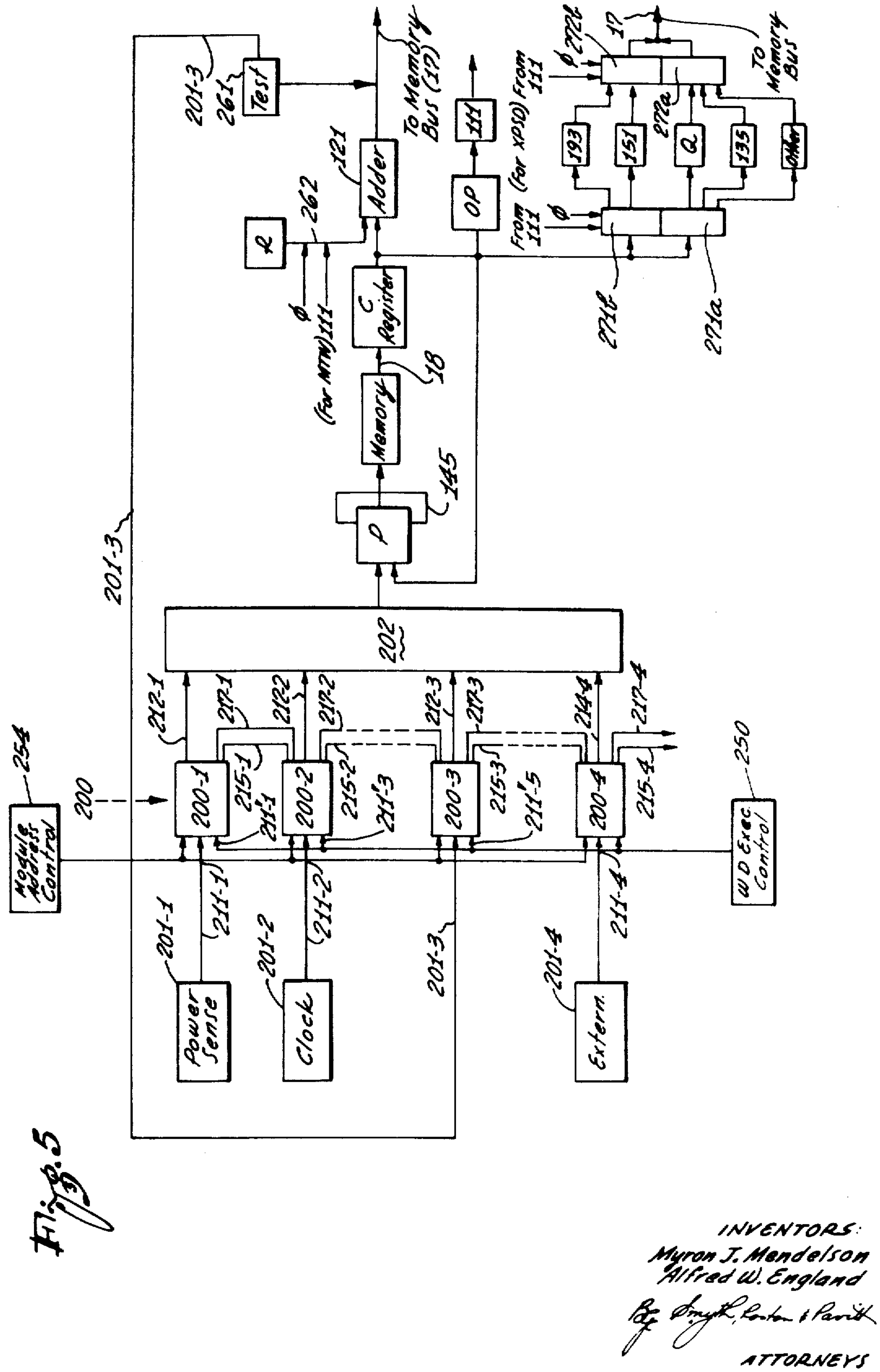
FIG. 5 illustrates somewhat schematically an interrupt module with addressing and control systems and its relation to modules pertaining to interrupt channels of higher and lower priorities.

As shown symbolically in FIG. 5, the timing and phasing unit 114 together with the operate code decoder unit 111 will cause a first particular portion **272*a* of a selector gate assembly to be opened so that the content of the Q register and of controller 135 and of the other elements are gated into particular bits positions of the memory bus 17** for transfer into the first one of the four memory addresses. This first address stems from the XPSD instruction word as the MA field thereof and was set into the P register.

Also as controlled by the timing and phasing unit the content of the P register is incremented by 1 (loop 145) to identify the next, i.e., the second memory location. The second portion **272*b* of this gate assembly now causes the present write key from register 193, and the content of the block pointer register 151, i.e., the pointer code to be gated to particularly assigned bit positions of the memory bus 17** for transfer to the second memory location. With this latter step now the entire memory block previously operated with is automatically saved which means that conceivably 16 words in the memory register are left intact without additional manipulation.

The other two memory locations addressed pursuant to execution of the instruction exchange program status double word now hold all the corresponding operating data and signals required to commence the priority operation that was demanded by the interrupt. During the third memory cycle of executing the XPSD instruction (the content of the P register having been advanced again by unity in the meantime) a first gate portion **271*a* is opened, and some of the bits appearing in memory output bus 18 will be set into the Q register, and a particular bit is set into controller 135. During the last of the four memory cycles the second portion 271*b* is opened and a new pointer code is set to the pointer register 151 to point to another block and another key is put into the register 193**, and other elements receive the data pertinent for arithmetic operations and others now to commence.

The execution of the instruction Load Program Status double word is very similar to the execution of the second phase, i.e., the third and fourth memory cycle of the XPSD instruction, except that the LPSD instruction additionally deactivates the currently active interrupt module of highest priority. Another refinement is possible in that the pointer code may not necessarily be changed when the instructions XPSD or LPSD are executed.

If bit position 8 of the LPSD or XPSD instruction word contains a one-bit the pointer code is replaced by a new pointer as aforedescribed. If, however, bit 8 of the LPSD or XPSD instruction word is a 0, the current register point value remains unchanged. Thus, in the latter case the portion of gates **271*b* and 272*a*** controlling the transfer of the pointer code will remain closed.

In order to avoid confusion, the bit position "8" just referred to is not part of the Program Double Word itself but is part of the instruction words XPSD and LPSD. This bit position 8 pertains to the R fields of these instructions which cannot be used here in the usual way because a possible exchange in pointer codes during execution of the instructions XPSD or LPSD would render such a register designation ambiguous.

Another bit position of the XPSD instruction word pertaining to the R field thereof and thus being free for other use are bit positions 10 and 11, also to be used in a way other than as register address.

As was mentioned above, deactivation of an interrupt module triggers a device 202 holding the address code of the respectively associated memory location. This memory location is accessed directly, circumventing the map. The programming of the contents of the memory locations associated with the interrupt channels is not subject to relocation by mapping.

The single instruction servicing subroutine discussed above (for example the MTW instruction) is also executed, without mapping, i.e., the memory location referred to in the MA field of the MTW instruction word interrupted as actual memory address, so that the interrupted program can be run with or without mapping and the brief interruption by this simple instruction servicing routine does not interfere here at all as there is immediate resumption. The situation is different when the interruption results in the execution of an XPSD instruction. Access to the memory location holding that instruction is, of course, done also with circumvention of the map, but when the XPSD instruction word is withdrawn from memory for execution as aforedescribed, the situation is as follows.

Bit position 10 of the XPSD instruction word determines how the effective address of the XPSD instruction word is to be interpreted for the addressing of the memory. If bit 10 of the XPSD word is a 1, the effective address, i.e., the MA field and the three additional addresses resulting from the subsequent incrementation are treated as virtual or program addresses, in which case each of the effective addresses is transformed through the memory map if the interrupted program is executed in the mapping mode (i.e., if bit 9 of the current Program Status Double Word as held in controller 135 is also a 1). The effective address, i.e., the MA field in the XPSD instruction word and the three consecutive numbers, are used as actual memory addresses if the computer is currently in the nonmapping mode at the time of the interruption (i.e., if bit 9 of the current Program Status Double Word is a 0). However, if bit 10 of the XPSD instruction word is a 0, the effective address is used as an actual address, regardless of whether the computer at the time of the interruption is currently in the mapping mode or in the nonmapping mode.

A brief remark is necessary here with regard to the control of mapping pursuant to execution of the XPSD instruction as being partially dependent on the status of controller 135 in accordance with the interrupted program. This controller 135 will receive a new bit during the second phase of executing the XPSD instruction as one component of the new Program Status Double Word, while the entire addressing process for withdrawal of the latter double word is governed by the status of controller 135 in accordance with the interrupted program. First of all, the gathering of data for assembling the current Program Status Double Word is a non-destructive process, only the substitution, i.e., the distribution of the bits of new Program Status Double Word finally destroys the old Program Status Double Word in the several locations. Moreover, the mapping (if any) or non-mapping for accessing the fourth memory location holding the second half of the new Program Status Double Word, has already been completed prior to insertion of a new bit into controller 135, so that a new bit here does not influence the execution of the XPSD instruction, only the old one does it.

It is significant that a change in the pointer code as held in register 151 is not restricted to such interrupt type operations. It may be, for example, of advantage to run the reloading of data within the memory and he may extensively use memory register as programmable locations. Instructions for storing arithmetic results will be required considerably less frequently than usual.

The principle behind these advantages resides in the fact that after execution of any instruction the main operating registers C and D are empty or their content can be destroyed. Separate operating index registers are not required at all. After the execution of each instruction all relevant data are held in memory locations, and may remain there indefinitely. The data held in the CPU system outside of the fast memory and at the time of termination of executing any instruction, are only control state data but not operands not represented elsewhere in the memory system. Basically, these control state data are the block pointer register content, the program counter number and other control state data such as a condition code sensing overflow conditions and others. All these control data can be "packed" into the two words to be exchanged for other two words as was outlined above, to change the current program without disturbing any numbers or data already processed or to be processed.

As was mentioned above, a memory register can be addressed via the R field code or the X field code, either one being combined with the current block pointer code. For reasons of available coding space, it may, however, be necessary to use either the R field or the X field of an instruction word for other purposes. Examples thereof were already given above.

In immediate operand type operations, so identified by particular operating codes, the MA nad X fields can be used to hold the bits of such operands; if the MA field does not hold an address code, indixing is superfluous for such instruction, as was outlined above.

Other types of instructions not yet mentioned are executed in a manner that particular ones of the registers of the current block are used without requiring particular addressing through any of the addressing fields in the instruction word. These registers will then be accessed by the decoded operating code so that the R field can be used otherwise. For example, the R field may define a count number in binary expansion denoting the number of memory locations pertaining to the operation and the MA field identifies the first program address of such a sequence.

In these cases the content of the R register is not applied to bus 115, but one or more particular, i.e., non-programmable block registers will be used, for example, as accumulator. Thus, if any of these latter type instructions appear in the instruction registers, the content of the R field of such instruction word is either not set into the R register at all or erased therefrom immediately. As these types of operations are dependent upon particular operating codes, the decoder 111 will thus cause a particular in-block code to be set into the R register.

This is shown in FIG. 1 as alternative input for the R register. The phasing signal $0_1$ will be developed for opening channel 112 as usual. The page pointer code is used also as usual for concatenation of a memory register address, that memory register address, however, is not derived from the R field for instruction word, i.e., it is not subject to programming, but it results from fixed association with a particular operate code. The loop 116 provides successive incrementation of the R register content, to sequentially address four registers of the current page.

Deviations from the normal instruction word format occur also, for example, for the writing of the map, for the loading of the access control registers 188, and for the loading of the lock register 190. To some extent these are similar processes and are carried out pursuant to the execution of one instruction called "Move To Memory Control", MMC for short, to be described next.

The MMC instruction word of course has an operate code and an R field. The MA field does not define a reference address and thus in this case the X field can be used otherwise. The three-bit positions of the X field are used as control codes to distinguish between the writing of the map, the loading of the lock register and the loading of the access control registers. Thus the X field is used here in a manner in that it can actually be regarded as an extension of the operate code field.

The block register identified by the R field contains the program memory address of a first memory word address. The memory location so identified and to be addressed will contain four or less page addresses, 16 or less "locks", or 16 or less access control codes, depending on the X field code. The operate code provides additionally that another register of the current block having an in-block code R+1 is to be accessed (see loop 116), and this register contains a count number for identifying the number of words needed to complete the particular loading process sought. Thus this count number will determine how many additional memory addresses will have to be accessed to withdraw therefrom additional page addresses or locks or access control codes.

One can see that 64 words are needed to rewrite the entire map 180 as it has 256 registers. Sixteen words are needed to reload all of the access control code registers; also, 16 words are needed to reload all of the lock registers. It follows that 64 will be the highest count number needed, so that only six-bit positions of the R+1 register are required for holding the count numbers.

The block register R+1 also holds a particular number in other bit positions, which is a page address identifying per se the first one of the page addresses of the map or of the access control registers to be rewritten. It will be recalled, that it is the program page code, i.e., the eight order bits of a program address, which is the addressing code for a map register or an access control register. For loading of the lock registers it will be a similar page address, as these protective codes are also affected pagewise. It will be recalled further that lock registers are addressed by actual memory page codes.

The execution of an MMC instruction will now proceed as follows: As the MMC instruction is withdrawn or copied from memory and set into the D, OP, R and X registers the decoded operate code will block the path 115 and the X field will instead determine access to registers 180, 180*a* or 190. Nothing is fed as yet into the P register, as there is no address code presented with the MMC instruction. The block register as identified by the R field and by the current pointer code held in register 151 is accessed, and the address code it contains passes through bus 170, C and D registers into the P register, and memory accessing is then controlled as described, with or without mapping.

The first operand word, as withdrawn from the accessed memory location, is set into the C register after a memory cycle. However, during this memory cycle, the following transpires. First the same addressing code is incremented by one (loop 145) and returned to the R field identified register via channel 141' and bus 175. Thereafter but still during the memory access cycle for the first operand, loop 116 increments the R field by 1 and the (R+1) code identified register of the current block is accessed to feed the count number and control start code to the bus 170 and C register. The control start code now appears at convenient bit positions in the C register, so that it can be transferred to the P registers to occupy the eight higher bit positions thus identifying a page. Depending now upon the X field code, and together with a decoded MMC code, this content of the P register now provides input access (a) in one of the registers 180 as identified by this page address and to the next three registers thereof, or (b) to the page code identified lock register plus the next 15 lock registers, all being part of the registers 190, or (c) to the page code identified one of registers 180*a*.

Due to the speed of access to the block register this access control to the respective ones of the registers 180, 180*a*, 190 is also completed before the operand will arrive from memory. After this latter operand word has been set into the C register it is distributed into the respectively accessed one of registers 180, 180*a*, or 190. In the meantime the count number is decremented by one the control start code is incremented by 4 or 16 (depending on the X field code) and the two thus modified numbers are returned to the R+1 block register. The R field is decremented by 1, the program address it holds defines now the next operand location and is withdrawn from the R block register, loaded to the P register to cause another memory cycle for withdrawing the next four page code or 16 locks or 16 access control codes. While this transpires the operand address is again incremented by 1 and returned to the R field identified block register. The R field is incremented by 1, the R+1 register is accessed for withdrawing the start page code plus four, or the start page plus 16 code, to access the next mapping registers, or the next 16 AC registers or the next 16 locks and the data word, now the second one, soon to arrive from memory, is being set into the thus prepared registers. In the meantime the count number is again decremented and the control code is incremented. The process continues in this manner until the sequentially decremented count number reaches zero whereupon the loading ceases, i.e., the execution of the MMC instruction is then terminated.

It is apparent, that this instruction MMC is of the type which can be interrupted as it is carried out in cycles. Each such cycle is completed when an operand word has been distributed into the several map, key or access control registers and when count number and control code have been modified and returned into the (R+1) code identified block register. At that point an interruptible point has been reached and a $0_{int}$ signal is issued to check whether any interrupt module is in the "waiting and enabled" state.

Flexibility of the computing system requires that not all instructions are executed to the word level, as this may waste valuable storage space, directly or indirectly as an extension of the program. For example, information may be handled in which items do not require the full 32 bit format, so that it is meaningful to operate with half-words or quarter-word (bytes). This, however, does not disturb the principles outlined above.

For example, for fast memory accessing it simply requires that not the entire content of a memory register be used but only one-half or one-fourth thereof. As the transfer channels to and from the memory registers are individual lines for each bit, with gates for each such bit line, the transfer of data from or to a memory register, to or from A or C registers, is controlled by additional gating or inhibiting signals. By affecting half, one-fourth or three-fourths of the transmission lines between a memory register and the A register, bit transfer is restricted to the half-word or byte level. Instructions involving half-words or bytes are identified by distinguishing operating codes (for example "add-full word" and "add-half word" have different operate codes). Thus, the controls unit 111 will for the half-word or byte type operating instruction develop such additional gating signals causing the unaffected half-word or bytes of the addressed full word location to be unaffected by the execution. Details are described in the copending application, Ser. No. 546,279 filed Apr. 29, 1966 now U.S. Pat. No. 3,405,396.

Other instructions may require operands which are two words long, i.e., having up to 64 bits. It would be cumbersome to handle the two words of this double word by separately executing two single word type instructions. A double-word of this type is actually stored in two memory locations but must be treated as a single number which is just longer than usual. Two memory locations are required for such double length number, and they have always consecutive addresses. The double-word program or memory address is always an even number and implies, that the second location needed is the one with the next higher odd number. Since only one location is particularly identified, the controlled line 145 increments the addressing number in the P register by unity when the not directly identified second location has to be accessed. If an instruction requires sequential access to a number of locations, as was described above with reference to the instructions MMC and XPSD, loop 145 will be controlled by a count number concurrently furnished directly or indirectly by the instruction word.

The same now holds true for R field identified memory registers in that control signals from the unit 111 may cause accessing of a second memory register which succeeds the register address-code-wise addressed by the R field code. Again, the loop 116 provides here for a suitable incrementation-by-unity for the R field code in the R register so that at first the R field identified register can be accessed, and subsequently the R field-plus-one register of the same block will be accessed without requiring the loading of a different R field code from any of the sources described.

In the embodiment described above the core memory section having a decimal number 0 to 15 was shaded by the fast memory, in that the four low order bits could be interpreted as referring to a memory register of the current block rather than to a core memory address of like code designation. However, this rule applies only when this address does not result from mapping or by way of a direct input-output operation. A memory address arrived at during mapping or by way of input-output operations and having a decimal number value between 0 and 15, will cause access to the particular core memory location and not to the current block. Thus the processing operation distinguishes the core memory from the fast memory. With the system illustrated, however, it is possible only to access a memory register of the current block. Any other memory register can be accessed only after the block pointer code in register 151 has been changed.

Figure 4:
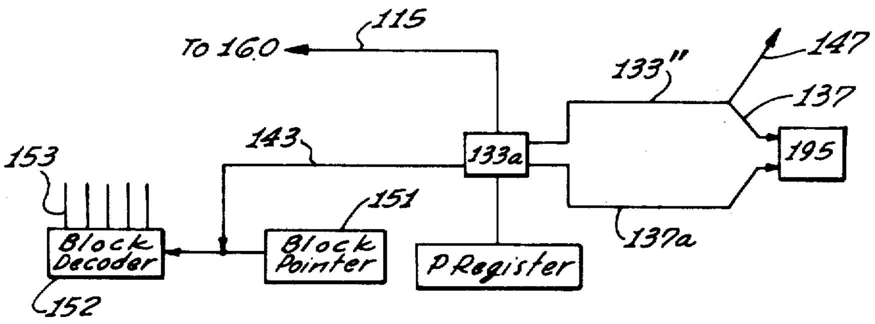
FIG. 4 is a block diagram of the particular modification of the system shown in FIG. 1.

The modification illustrated in FIG. 4 permits access to any memory register, using the addressing numbers in the P register. In this case, additional program addresses are shaded but mapping permits access to any memory address. For example, an addressing number when in the P register may have zeros in the 11th through 17th bit position of the full memory type address (zero-memory page). The nine remaining digits can be construed as follows: five bits define a block, four bits define a register in the block. Thus in this case there will be provided a modified separator 133a with three output channels. The first one is output channel 134 which is the same mentioned above receiving the four low order bits fed thereto in case the program address has again a decimal number between 0 and 15. As aforedescribed channel 134 leads to bus 115, thus addressing of the current block as memory is as before.

The four-bit line 134, however, will receive the four lowest order bits of a program address, if the program address has zero bits in the 10th to 17th bit positions only to thereby provide shading for an entire program address page of 512 memory locations, as there are altogether 512. potential fast memory register. A five line channel or bus 142 provides the five bits of the fifth to ninth bit position of the program address to the block decoder 152 as substitution for the pointer code number held in block pointer register 151. The content of the pointer register 151 should not change so that the operative connection between register 151 and decoder 152 is interrupted. This channel 143 is enabled only if the eight high order bits of the program address are all zeros, and if the fifth to 10th bit positions of a program address hold bits which are not all zeros. It should be mentioned, that the code number in lines 143 may happen to be the same as the number currently held in the block pointer register 151, so that this is a second mode of addressing the current block as memory.

The block pointing substitute code defined in lines 143 opens up the particular block now addressed directly; this may be the current block or any of the other block as stated. Only if the eight high order bits of the program address define a decimal number unequal to zero, then the full address is passed to the channel 133'' for the same purpose as was outlined above, so that after mapping the core member can be addressed, and the nine lines 134 and 143 do not receive any signals.

It can be seen here that the inventive system is susceptible to a great degree of flexibility. It can be seen further that the map registers could also be rendered addressable within the addressing continuum with or without shading or like numbered core addresses. This is particularly so if one considers that the eight high order bits of any program address can be interpreted by the processor, i.e., the operate code decoder as word addresses to be used in the lines 137 for addressing the mapping register.

In other words, there is no requirement that only the eight high order bits of an addressing number when fed through channels 137 can address a mapping register. The process control (operate decoder) can be designed to interpret particular program address numbers as mapping register address codes in general. For this, one can use the upper half of the addressing continuum which is the page of the highest order, having eight high order one-bits, and the nine low order bits of the same number are then interpreted as map register addresses. This is the function of a fourth output channel 137*a* of the separator 133*a* in FIG. 4; it detects these eight high order one-bits and feeds the remaining nine low order bits to decoder 195. Again it can be seen that this mode of addressing the mapping registers will not result from mapping or input output operations. Any core memory address arrived at after mapping and being located in the memory page of the highest order will cause access to a core memory location and not to a mapping register.

The invention is not limited to the embodiments described above but all changes and modifications thereof not constituting departures from the spirit and scope of the invention are intended to be included.

We claim:

1. In a general purpose stored program computer the combination comprising:

a random access memory having a first portion which includes a first plurality of individually addressable storage locations for storing information signals in representation of at least one computing program and including operands and instructions for execution of the program, said memory having a second portion which includes a second plurality of individually addressable storage locations for storing information signals and having access speed faster than the speed for access to the locations of the first plurality, a location of the second plurality being individually addressable by a block selector code and an in-block code;

memory access control means for receiving memory addressing signals and providing access to the locations of the first plurality to withdraw the content of and/or load the same or a new content into the accessed location;

program means including the memory access control means and operating to withdraw a sequence of instruction signals from the memory in representation of the program and including means for receiving signals representing individual instructions of the sequence, the means for receiving instruction signals having a plurality of sections of different operative significance and including first, second and third sections and a section for holding an operate code of an instruction signal, at least some of the instruction signals as received by the means for receiving instruction signals from memory by operation of the program means including, for each instruction, two in-block codes set, respectively, into the first and second section, and an operand addressing code set into the third section for serving as operand memory addressing signal for the memory access control means;

processor means responsive to the operate code held in the operate code section of the means for receiving instruction signals, to provide instruction execution operations including operations for at least some of the instructions requiring operands held in locations in either or both portions of the memory and including operations which for some of the instructions require participation of an accumulator, source and/or destination registers for information signals;

a block selector register providing a block selector code signal and connected to said second portion of the memory for rendering a block of the second plurality storage locations available as general purpose register, accumulator and index register to the exclusion of the remaining locations of the second plurality not included in the block as selected by the current block selector code held in said block selector register;

first means connected to be responsive to the in-block code in the first particular section of the means for receiving instruction signals, to access a location of the selected block and to combine the content thereof with the operand addressing code held in the third particular section of the instruction register, and providing an indexed operand address as addressing signals to said memory access control means, for at least some of the instructions in the program;

second means connected to be responsive to the in-block code held as content in the second particular section in the means for receiving instruction signals, to access a location in the selected block and being operative for at least some instructions of the program, the accessed location to serve as accumulator or general register, the second means operating concurrently with operation of the access control means for the same instruction; and means included in the processor means and responsive to at least one particular instruction operate code and connected to the block selector register to change the block selector code signal therein.

2. In a computer as set forth in claim 1, the memory access control means constructed to be responsive to addressing signals having numerical value within a particular addressing number continuum but different from any of said in-block codes, interpreted as numbers within the addressing continuum, to provide access to locations of the first plurality, the memory access control means including additional means responsive particularly to addressing signals having numerical value of any of said in-block codes, interpreted as numbers within the addressing continuum, to provide access to the block selected by the block selector code held in the block selector register and independently from the current content in the first or third particular sections of the instruction register.

3. In a computer as set forth in claim 1, the memory locations of the first plurality being grouped in pages addressable by a page code, each page having a similar plurality of locations, addressable by an in-page code, a memory location of the first plurality being addressable by concurrence of a page code and an in-page code;

the memory access control means including a plurality of registers, each holding signals in representation of a particular memory page code, the access control means further including:

means (a) connected to be responsive to the memory addressing signals received by the access control means and separating first and second portions in each addressing signal received;

means (b) connected to be responsive to the first portion of the separated addressing signals, and addressing a register of the plurality;

means (c) connected to be responsive to the page code held in the accessed register to access the corresponding memory page; and means (d) connected to access a memory location of the first plurality, within the accessed page and in response to said separated second portion as in-page addressing code.

4. In a computer as set forth in claim 3, the memory access control means further including means responsive to addressing signals the first portion of which pertaining to a particular page, the second portion thereof having a numeral value within the range of numbers encompassed by the in-block codes, to inhibit accessing of a register of the plurality and to access instead a second location of the block selected by the current block selection code as held in the block selection register.

5. In a computer as set forth in claim 1, the first means responsive to the operate code to particularly multiply or divide the number held as content of the location in the selected block as addressed by the in-block code and as held in said first section, and including means to additively combine the multiplied or divided number with the operand addressing code to obtain the indexed number code.

6. In a computer as set forth in claim 1, the processor including means to provide sequential operation of the first and second means for each instruction having said two in-block codes.

7. In a general purpose, stored program computer the combination comprising:

a random access memory having a first portion which includes a first plurality of individually addressable storage locations for storing information signals in representation of at least one computing program, the program including operands and instructions for execution of the program, said memory having a second portion which includes a second plurality of individually addressable storage locations for storing information signals and having access speed faster than the speed for access to the locations of the first plurality;

memory access control means for receiving memory addressing signals and providing access to the locations of the first plurality to withdraw the content of and/or load the same or a new content into the accessen location;

program means including the memory access control means and operating to withdraw instruction signals from the memory in representation of the program, the program means including first means to provide instruction addresses to the memory access control in sequence of the program as defined by a sequence of instructions, the program means including second means for receiving signals representing the individual instructions as withdrawn, the second means for receiving instruction signals having a plurality of sections of different operative significance and including first, second and third sections and a section for holding an operate code of an instruction signal, at least some of the instruction signals as received by the second means including, for each instruction, two second-plurality-location addressing codes set, respectively, into the first and second section, and an operand addressing code set into the third section for serving as operand memory addressing signal for the memory access control means;

processor means responsive to the operate code held in the operate code section of the second means to provide instruction execution operations including operations for at least some of the instructions requiring operands held in locations in either or both portions of the memory and including operations which for some of the instructions require participation of an accumulator, source and/or destination registers for information signals;

third means connected to be responsive to the code in the first particular section of the second means to access a location of the second plurality to withdraw the content thereof;

fourth means connected to the processor to particularly multiply or divide the number represented by the content of the location accessed by the fourth means, and to additionally combine the multiplied or divided number with the operand addressing code held in the third particular section of the second means and providing an indexed operand address as addressing signals to said memory access control means, for at least some of the instruction in the program;

and means connected to be responsive to the code held as content in the second particular section in the second means to access another location of the second plurality and being operative for at least some instructions of the program, the latter accessed location to serve as accumulator or general register, the fifths means operating concurrently with operation of the access control means for the same instruction.

8. In a computer as set forth in claim 7, the memory locations of the first plurality being grouped in pages addressable by a page code, each page having a similar plurality of locations, addressable by an in-page code, a memory location of the first plurality being addressable by concurrence of a page code and an in-page code;

the memory access control means including a plurality of registers, each holding signals in representation of a particular memory page code, the access control means further including:

means (a) connected to be responsive to the memory addressing signals received by the access control means and separating first and second portions in each addressing signal received;

means (b) connected to be responsive to the first portion of the separated addressing signals, and addressing a register of the plurality;

means (c) connected to be responsive to the page code held in the accessed register to access the corresponding memory page; and means (d) connected to access a memory location of the first plurality, within the accessed page and in response to said separated second portion as in-page addressing code.

* * * * *